(12) United States Patent
Höglund et al.

(10) Patent No.: US 12,028,794 B2
(45) Date of Patent: Jul. 2, 2024

(54) TECHNIQUE FOR TRANSMITTING SYSTEM INFORMATION

(71) Applicant: Telefonaktiebolaget LM Ericsson (publ), Stockholm (SE)

(72) Inventors: Andreas Höglund, Solna (SE); Xingqin Lin, Santa Clara, CA (US); Yuhang Liu, Lund (SE); Gerardo Agni Medina Acosta, Märsta (SE); Ritesh Shreevastav, Upplands Väsby (SE); Yutao Sui, Solna (SE); Yi-Pin Eric Wang, Fremont, CA (US); Stefan Wänstedt, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/759,767

(22) PCT Filed: Dec. 18, 2017

(86) PCT No.: PCT/EP2017/083340
§ 371 (c)(1),
(2) Date: Apr. 28, 2020

(87) PCT Pub. No.: WO2019/096431
PCT Pub. Date: May 23, 2019

(65) Prior Publication Data
US 2021/0099944 A1    Apr. 1, 2021

Related U.S. Application Data

(60) Provisional application No. 62/585,930, filed on Nov. 14, 2017.

(51) Int. Cl.
*H04W 48/08* (2009.01)
*G16Y 10/75* (2020.01)
(Continued)

(52) U.S. Cl.
CPC .......... *H04W 48/08* (2013.01); *G16Y 10/75* (2020.01); *H04L 5/0005* (2013.01); *H04L 5/14* (2013.01)

(58) Field of Classification Search
CPC ... H04L 5/0005; H04L 5/0007; H04L 5/0048; H04L 5/0051; H04L 5/0053; H04L 5/001;
(Continued)

(56) References Cited

U.S. PATENT DOCUMENTS

2013/0301552 A1    11/2013  Xu et al.
2014/0211644 A1*   7/2014   Giannakis .......... H04W 16/14
                                                              370/252
(Continued)

FOREIGN PATENT DOCUMENTS

CN    103947276 A    7/2014
CN    107046721 A    8/2017
(Continued)

OTHER PUBLICATIONS

U.S. Appl. No. 62/544,256, filed Aug. 11, 2017 (Year: 2017).*
(Continued)

*Primary Examiner* — Peter Chen
(74) *Attorney, Agent, or Firm* — COATS & BENNETT, PLLC

(57) ABSTRACT

A technique for transmitting system information for a time-division duplex, TDD, communication in a radio access network, RAN, is described. As to a method aspect of the technique, a master information block, MIB, is transmitted on an anchor carrier (602 1) of the TDD communication in the RAN. The MIB is indicative of a spectral resource (602-1; 602-2) allocated to a system information block, SIB, of the TDD communication in the RAN. The SIB is transmitted on the spectral resource (602-1; 602-2) indicated in the MIB.

21 Claims, 17 Drawing Sheets

(51) Int. Cl.
*H04L 5/00* (2006.01)
*H04L 5/14* (2006.01)

(58) Field of Classification Search
CPC ......... H04L 5/14; H04L 5/1469; H04L 5/005; H04L 5/023; H04L 5/0098; H04W 4/70; H04W 72/0453; H04W 48/08; H04W 48/10; H04W 48/12; G16Y 10/75
See application file for complete search history.

(56) References Cited

U.S. PATENT DOCUMENTS

| | | | |
|---|---|---|---|
| 2014/0341141 A1 | 11/2014 | Nguyen et al. | |
| 2016/0315752 A1* | 10/2016 | Chen | H04W 48/10 |
| 2017/0135005 A1 | 5/2017 | Basu Mallick et al. | |
| 2017/0265156 A1* | 9/2017 | Xue | H04L 5/0092 |
| 2018/0234169 A1* | 8/2018 | Sridharan | H04L 1/08 |
| 2019/0045553 A1 | 2/2019 | Zhang et al. | |
| 2020/0136880 A1* | 4/2020 | Chen | H04W 56/0015 |
| 2020/0163032 A1* | 5/2020 | Su | H04W 56/00 |
| 2020/0396722 A1* | 12/2020 | Han | H04L 1/18 |

FOREIGN PATENT DOCUMENTS

| | | | |
|---|---|---|---|
| WO | 2016172293 A1 | 10/2016 | |
| WO | 2016205123 A1 | 12/2016 | |

OTHER PUBLICATIONS

LG Electronics, "Discussion on NB-MIB Contents for NB-IoT", 3GPP TSG RAN1 NB-IoT Ad-Hoc Meeting, Sophia Antipolis, France, Mar. 22, 2016, pp. 1-5, R1-161965, 3GPP.

Huawei et al., "TDD Support in NB-IoT", 3GPP TSG-RAN WG2 Meeting #99bis, Prague, Czech Republic, Oct. 9, 2017, pp. 1-9, R2-1711332, 3GPP.

Huawei et al., "Revised Work Item: Narrowband IoT (NB-IoT)", 3GPP TSG RAN Meeting #70, Sitges, Spain, Dec. 7, 2015, pp. 1-9, RP-152284, 3GPP.

Wi Rapporteur (Ericsson), "RAN1 Agreements for Rel-13 NB-IoT", 3GPP TSG-RAN WG1 Meeting #84, St. Julian's, Malta, Feb. 15, 2016, pp. 1-11, R1-161548, 3GPP.

Ericsson, "NB-IoT Channel Raster", 3GPP TSG-RAN1 NB-IoT Ad Hoc, Budapest, Hungary, Jan. 18, 2016, pp. 1-3, R1-160082, 3GPP.

Huawei et al., "Channel Raster Design", 3GPP TSG RAN WG1 NB-IoT Ad-Hoc Meeting, Budapest, Hungary, Jan. 18, 2016, pp. 1-5, R1-160022, 3GPP.

Ericsson, "NB-IoT—Synchronization Channel Evaluations", 3GPP TSG-RAN WG1 NB-IoT AdHoc, Budapest, Hungary, Jan. 18, 2016, pp. 1-6, R1-160080, 3GPP.

Huawei et al., "Synchronization Signal Evaluation", 3GPP TSG RAN WG1 NB-IoT Ad-Hoc Meeting, Budapest, Hungary, Jan. 18, 2016, pp. 1-7, R1-160021, 3GPP.

Huawei et al., "Revised WID on Further NB-IoT Enhancements", 3GPP TSG RAN Meeting #76, West Palm Beach, USA, Jun. 5, 2017, pp. 1-5, RP-171428, 3GPP.

Ad-Hoc Chair (Huawei), "Chairman's Notes of AI 6.2.6 Further Enhancements of NB-IoT", 3GPP TSG RAN WG1 Meeting #90bis, Prague, Czech Republic, Oct. 9, 2017, pp. 1-7, R1-1719127, 3GPP.

Nokia et al., "Channel Raster for Multiple Standalone NB-IoT Carriers", 3GPP TSG-RAN WG4 Meeting #82bis, Spokane, USA, Apr. 3, 2017, pp. 1-5, R4-1703804, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 14)", Technical Specification, 3GPP TS 36.331 V14.4.0, Sep. 1, 2017, pp. 1-753, 3GPP.

3rd Generation Partnership Project, "3rd Generation Partnership Project; Technical Specification Group Radio Access Network; Evolved Universal Terrestrial Radio Access (E-UTRA); Physical Channels and Modulation (Release 14)", Technical Specification, 3GPP TS 36.211 V14.4.0, Sep. 1, 2017, pp. 1-197, 3GPP.

3rd Generation Partnership Project, "3rd Generation Partnership Project; Technical Specification Group Radio Access Network; Evolved Universal Terrestrial Radio Access (E-UTRA); Base Station (BS) Radio Transmission and Reception (Release 14)", Technical Specification, 3GPP TS 36.104 V14.5.0, Sep. 1, 2017, pp. 1-230, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14)", Technical Specification, 3GPP TS 36.300 V14.4.0, Sep. 1, 2017, pp. 1-329, 3GPP.

3rd Generation Partnership Project, "3rd Generation Partnership Project; Technical Specification Group Radio Access Network; Evolved Universal Terrestrial Radio Access (E-Utra); FDD Repeater Radio Transmission and Reception (Release 14)", Technical Specification, 3GPP TS 36.106 V14.0.0, Mar. 1, 2017, pp. 1-53, 3GPP.

Samsung, "Discussion on DL common channel/signal for TDD NB-IoT", 3GPP TSG RAN WG1 Meeting #90bis, Prague, CZ, Oct. 9, 2017, pp. 1-4, R1-1717570, 3GPP.

Huawei et al., "Cell search and system information acquisition improvements in eFeMTC", 3GPP TSG RAN WG1 Meeting #89, Hangzhou, China, May 15, 2017, pp. 1-4, R1- 1707017, 3GPP.

Nokia et al., "Downlink aspects of TDD support in NB-IoT", 3GPP TSG RAN WG1 Meeting #90, Prague, Czechia, Aug. 21, 2017, pp. 1-3, R1-1713797, 3GPP.

Ericsson, "On NB-IoT, eMTC and NR coexistence", 3GPP TSG-RAN1 Meeting #87, Reno, Nevada, Nov. 14, 2016, pp. 1-8, R1-1612942, 3GPP.

* cited by examiner

TECHNIQUE FOR TRANSMITTING SYSTEM INFORMATION

TECHNICAL FIELD

The present disclosure generally relates to a technique for transmitting and receiving system information. More specifically, methods and devices are provided for transmitting and receiving system information blocks in a radio access network.

BACKGROUND

Radio devices access a radio access network (RAN) by scanning certain radio carriers for time synchronization signals and system information elements essential for accessing the RAN. Examples for such radio devices include mobile broadband (MBB) devices such as user equipments (UEs) according to the 3rd Generation Partnership Project (3GPP) Long Term Evolution (LTE) and narrowband (NB) devices such as 3GPP NB Internet of Things (NB-IoT) UEs. Examples for essential system information include master information blocks (MIBs) for 3GPP system. A carrier that facilitates an initial synchronization of the NB-IoT UE is referred to as an anchor carrier.

Similar to existing LTE UEs, an NB-IoT UE is only required to search for a carrier on a 100 kHz carrier raster, i.e., the NB-IoT UEs try to search for the NB-IoT carriers in steps sized 100 kHz. Hence, the carrier raster for downlink of NB-IoT systems is on a frequency grid of 100 kHz. The 100 kHz-raster implies that for an in-band deployment of the NB-IoT system, the anchor carrier can only be placed in certain physical resource blocks (PRBs) of the LTE system.

In a NB-IoT system configured for time division duplexing (TDD), downlink and uplink transmissions have to share the same carrier frequency. The transmission of primary synchronization signals, secondary synchronization signals and physical broadcast channels for the MIB-NB occupy the downlink, so that there are very few downlink subframes left on the anchor carrier for the other system information broadcasting, paging and downlink user traffic.

Furthermore, the partitioning of downlink and uplink subframes in TDD RANs is defined by an uplink-downlink TDD configuration. For some uplink-centric configurations, such as the configuration 6 according to Table 4.2-2 in document 3GPP TS 36.211 (e.g., version 14.4.0), there is almost no downlink subframes left for anything else after scheduling transmissions of the synchronization signals and the physical broadcast channel for the MIB-NB. One approach may avoid such configurations, but the coexistence of the MBB system and the NB system in the RAN requires such configurations at least in some deployments. For example, an LTE system may require an uplink-centric uplink-downlink TDD configuration, and the NB-IoT system may have to use the same uplink-downlink TDD configuration that is used by the LTE system. Another approach may use very different formats of the MIB-NB depending on the uplink-downlink TDD configuration, but different formats increase the complexity of the radio devices, which contravenes the slim designs of NB-IoT UEs at least in some deployments.

SUMMARY

Accordingly, there is a need for technique that transmits system information flexibly and efficiently in time-division duplexing radio access networks. More specifically, there is a need for a technique that allows transmitting the system information in various uplink-downlink time-division duplexing configurations. Alternatively or in addition, there is a need for a technique that allows transmitting narrowband system information using a unified format in different deployments relative to a mobile broadband system.

As to one aspect, a method of transmitting system information for a time-division duplex, TDD, communication in a radio access network, RAN, is provided. The method comprises or triggers a step of transmitting a master information block, MIB, on an anchor carrier of the TDD communication in the RAN. The MIB is indicative of a spectral resource allocated to a system information block, SIB, of the TDD communication in the RAN. The method further comprises or triggers a step of transmitting the SIB on the spectral resource indicated in the MIB.

The method may be implemented as a method of indicating a spectral resource for SIB transmission in a TDD communication. The functionality and/or the resources (e.g., of the RAN) for the TDD communication may be referred to as a TDD system. The TDD communication may involve at least one radio device within coverage of the RAN. Herein, radio device and user equipment (UE) may be used interchangeably.

The spectral resource may include a non-anchor carrier other than the anchor carrier. The non-anchor carrier may be a carrier on which the radio device does not assume that a primary synchronization signal, a secondary synchronization signal and/or the MIB are transmitted. For example, the non-anchor carrier may be off a carrier raster defining carrier frequencies for potential anchor carriers. The carrier raster may be compatible with Section 5.7.2 of document 3GPP TS 36.104 (e.g., Version 14.5.0).

The technique may be implemented for a narrowband (NB) TDD communication. The functionality and/or the resources (e.g., of the RAN) for the NB TDD communication may be referred to as a NB TDD system or NB Internet of Things (NB-IoT) TDD system (or briefly: NB system or NB-IoT system). Herein, NB and NB-IoT may be used interchangeably. The MIB and the SIB for the NB TDD communication may be referred to as MIB-NB and SIB-NB (e.g., SIB1-NB), respectively. Radio devices involved in or configured for the NB TDD communication may be referred to as NB IoT devices.

The technique may be compatible with different deployments (also: operation modes) relative to the absence or coexistence of a mobile broadband (MBB) communication in the RAN. The deployments may include at least one of a deployment of the NB communication in-band with the MBB communication, a deployment of the NB communication in one or more guard-bands of the MBB communication and a standalone deployment of the NB communication independent of an MBB communication. The deployments may include those in Section 5.5a of the document 3GPP TS 36.300 (e.g., Version 14.4.0).

At least some embodiments of the technique enable the RAN to effectively indicate the spectral resource (e.g., a non-anchor carrier) of the SIB. A few bits in the MIB may be indicative of the spectral resource of the SIB. By implementing the technique in the NB-IoT TDD system, the RAN can have reasonable flexibility to transmit the SIB on the anchor carrier or on a non-anchor carrier (e.g., for all the three deployments) at a reasonably low cost of signaling overhead and/or design complexity for the NB IoT devices.

The one aspect of the technique may be implemented at the RAN. A base station or a cell of the RAN may perform the method. The base station may encompass any station that is configured to provide radio access to the at least one radio device. The radio device or each of the radio devices may be a user equipment (UE).

As to another aspect, a method of receiving system information for a time-division duplex, TDD, communication in a radio access network, RAN, is provided. The method comprises or triggers a step of receiving a master information block, MIB, on an anchor carrier of the TDD communication in the RAN. The MIB is indicative of a spectral resource allocated to a system information block, SIB, of the TDD communication in the RAN. The method further comprises or triggers a step of receiving the SIB on the spectral resource indicated in the MIB.

The other aspect of the technique may comprise any feature or step disclosed herein in the context the one aspect, or any feature or step corresponding to such disclosure at the side of the other aspect.

The other aspect of the technique may be implemented by the radio device. The radio device may be configured for peer-to-peer communication (e.g., on a sidelink) and/or for accessing the RAN (e.g. an UL and/or downlink, DL). The radio device may be a user equipment (UE, e.g., a 3GPP UE) or a mobile or portable station (STA, e.g. a Wi-Fi STA). Particularly, the radio device may be a NB-IoT device and/or a device for machine-type communication (MTC).

As to further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the RAN and/or via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for transmitting system information for a time-division duplex, TDD, communication in a radio access network, RAN, is provided. The device is configured to perform the one method aspect.

As to another device aspect, a device for receiving system information for a time-division duplex, TDD, communication in a radio access network, RAN, is provided. The device is configured to perform the other method aspect.

As to a still further aspect, a device for transmitting system information for a time-division duplex, TDD, communication in a radio access network, RAN, is provided. The device comprises at least one processor and a memory. Said memory comprises instructions executable by said at least one processor whereby the device is operative to transmit a master information block, MIB, on an anchor carrier of the TDD communication in the RAN. The MIB is indicative of a spectral resource allocated to a system information block, SIB, of the TDD communication in the RAN. Execution of the instructions further causes the device to be operative to transmit the SIB on the spectral resource indicated in the MIB.

As to a still further aspect, a device for receiving system information for a time-division duplex, TDD, communication in a radio access network, RAN, is provided. The device comprises at least one processor and a memory. Said memory comprises instructions executable by said at least one processor whereby the device is operative to receive a master information block, MIB, on an anchor carrier of the TDD communication in the RAN. The MIB is indicative of a spectral resource allocated to a system information block, SIB, of the TDD communication in the RAN. Execution of the instructions further causes the device to be operative to receive the SIB on the spectral resource indicated in the MIB.

The device (e.g., any base station or radio device embodying the technique) may further include any feature disclosed in the context of the any one of the method aspects. Particularly, any device may comprise units or modules configured to perform or trigger one or more of the steps of any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
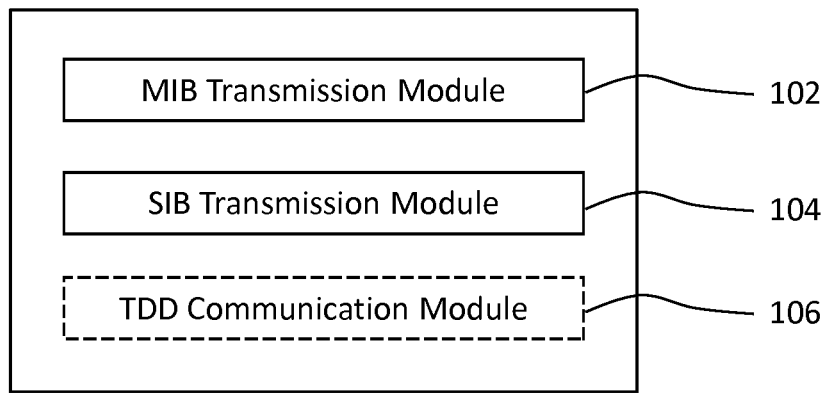
FIG. 1 shows a schematic block diagram of a device for transmitting system information for a time-division duplex communication in a radio access network.

FIG. 1 schematically illustrates a block diagram of a device for transmitting system information for a time-division duplex (TDD) communication in a radio access network (RAN). The device is generically referred to by reference sign 100.

The device 100 comprises an MIB transmission module 102 that transmits a master information block (MIB) on an anchor carrier of the TDD communication in the RAN. The MIB is indicative of a spectral resource allocated to a system information block (SIB) of the TDD communication in the RAN. The device 100 further comprises an SIB transmission module 104 that transmits the SIB on the spectral resource indicated in the MIB.

The system information may comprise or depend on at least one of the transmitted MIB and the transmitted SIB. Optionally, the device 100 may further comprise a TDD communication module 106 that performs the TDD communication according to the system information by at least one of transmitting payload data, receiving payload data and scheduling a transmission and/or reception of payload data.

The device 100 may be connected to and/or part of the RAN. The device 100 may be embodied by or at a base station of the RAN, one or more nodes connected to the RAN for controlling the base station or a combination thereof. Any of the modules of the device 100 may be implemented by units configured to provide the corresponding functionality.

The base station may encompass a network controller (e.g., a Wi-Fi access point according to IEEE 802.11) or a radio access node (e.g. a 3G Node B, a 4G eNodeB or a 5G gNodeB) of the RAN. The base station may be configured to provide radio access to a plurality of radio devices.

The system information, particularly the MIB and/or the SIB, may be transmitted (e.g., broadcasted) to one or more radio devices. Each radio device may be configured to wirelessly connect to the RAN, particularly to a base station of the RAN.

Furthermore, the TDD communication may be a narrowband (NB) communication. Some or each of the radio devices may be configured for the NB communication in the RAN. Some or each of the radio devices may be a NB Internet of Things (NB-IoT) device.

Alternatively or in addition, some or each of the radio devices may be a user equipment (UE), e.g., according to 3GPP, and/or a mobile or portable station, e.g., according to IEEE 802.11. Two or more radio devices may be configured to wirelessly connect to each other, e.g., in an ad-hoc radio network or via 3GPP sidelinks according to the system information.

Figure 2:
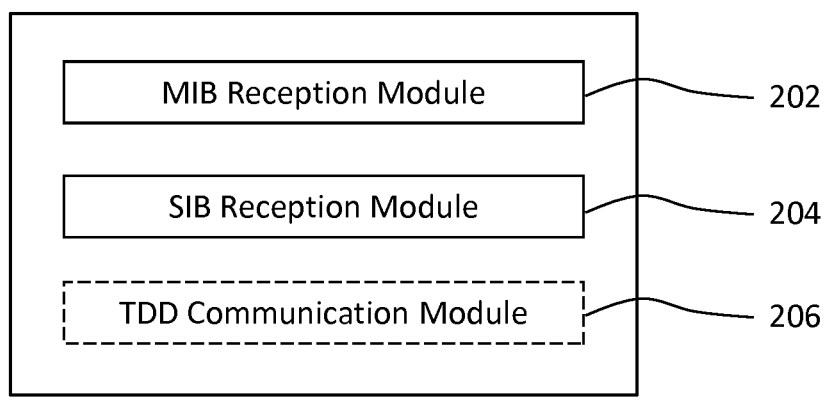
FIG. 2 shows a schematic block diagram of a device for receiving system information for a time-division duplex communication in a radio access network.

FIG. 2 schematically illustrates a block diagram of a device for receiving system information for a time-division duplex (TDD) communication in a radio access network (RAN). The device is generically referred to by reference sign 200.

The device 200 comprises an MIB reception module 202 that receives a master information block (MIB) on an anchor carrier of the TDD communication in the RAN. The MIB is indicative of a spectral resource allocated to a system information block (SIB) of the TDD communication in the RAN. The device 200 further comprises an SIB reception module 204 that receives the SIB on the spectral resource indicated in the MIB.

The system information may comprise or depend on at least one of the received MIB and the received SIB. Optionally, the device 200 may further comprise a TDD communication module 206 that performs the TDD communication according to the system information by at least one of receiving payload data, transmitting payload data and being scheduled a reception and/or transmission of payload data.

The device 200 may be connected to, embodied by and/or part of a radio device. Any of the modules of the device 200 may be implemented by units configured to provide the corresponding functionality.

The radio device may be configured to wirelessly connect to the RAN, particularly to a base station of the RAN, based on the system information. The radio device may be a user equipment (UE), e.g., according to 3GPP, and/or a mobile or portable station, e.g., according to IEEE 802.11 (Wi-Fi). Alternatively or in addition, the radio device may be configured to wirelessly connect to another embodiment of the radio device according to the system information, e.g., in an ad-hoc radio network or via 3GPP sidelinks.

The TDD communication may be a narrowband (NB) communication. The radio device may be configured for the NB communication in the RAN. The radio device may be a NB Internet of Things (NB-IoT) device.

The base station may encompass a network controller (e.g., a Wi-Fi access point) or a radio access node (e.g. a 3G Node B, a 4G eNodeB or a 5G gNodeB) of the RAN. The base station may be configured to provide radio access to the radio device.

Figure 3:
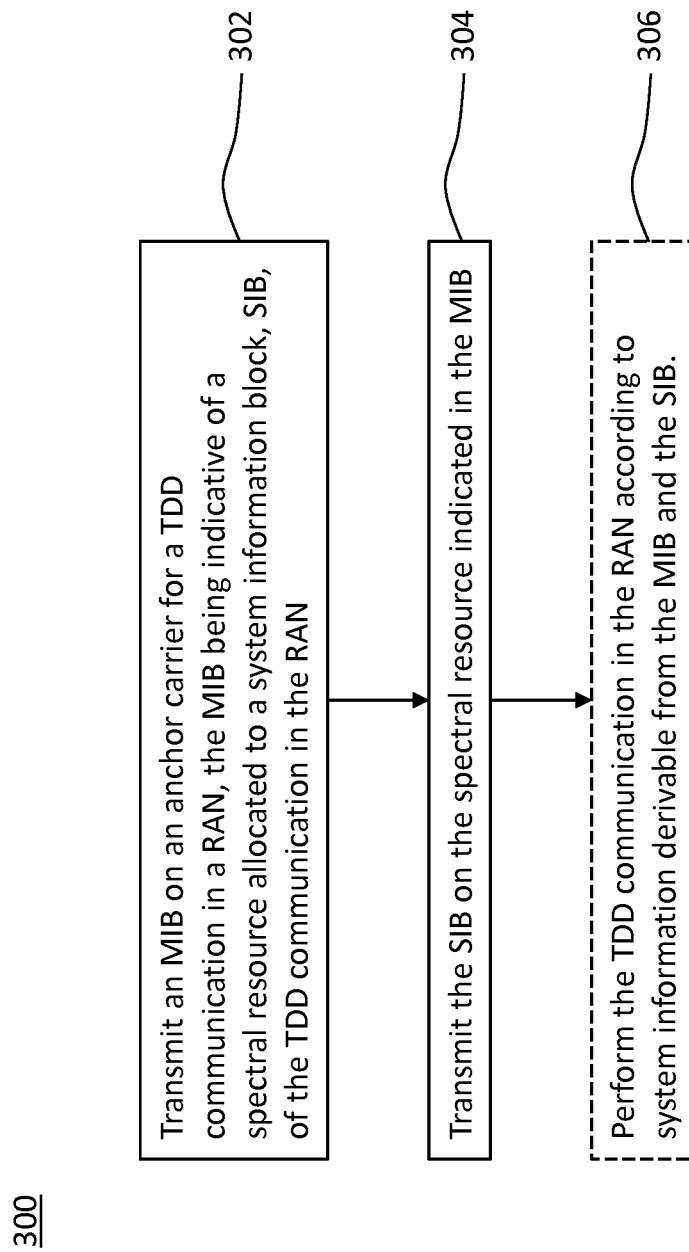
FIG. 3 shows a flowchart for a method of transmitting system information for a time-division duplex communication in a radio access network, which is implementable by the device of FIG. 1.

FIG. 3 shows a flowchart for a method 300 of transmitting system information for a time-division duplex (TDD) communication in a radio access network (RAN). The method comprises or triggers a step 302 of transmitting a master information block (MIB) on an anchor carrier of the TDD communication in the RAN. The MIB is indicative of a spectral resource allocated to a system information block (SIB) of the TDD communication in the RAN. In a step 304 of the method 300, the SIB is transmitted on the spectral resource indicated in the MIB.

The system information may be derivable using at least one of the transmitted MIB and the transmitted SIB. Optionally, in a step 306, the TDD communication is performed in the RAN based on the system information.

The method 300 may be performed by the device 100, e.g., at or using the base station of the RAN. For example, the modules 102 and 104 may perform the steps 302 and 304, respectively.

Figure 4:
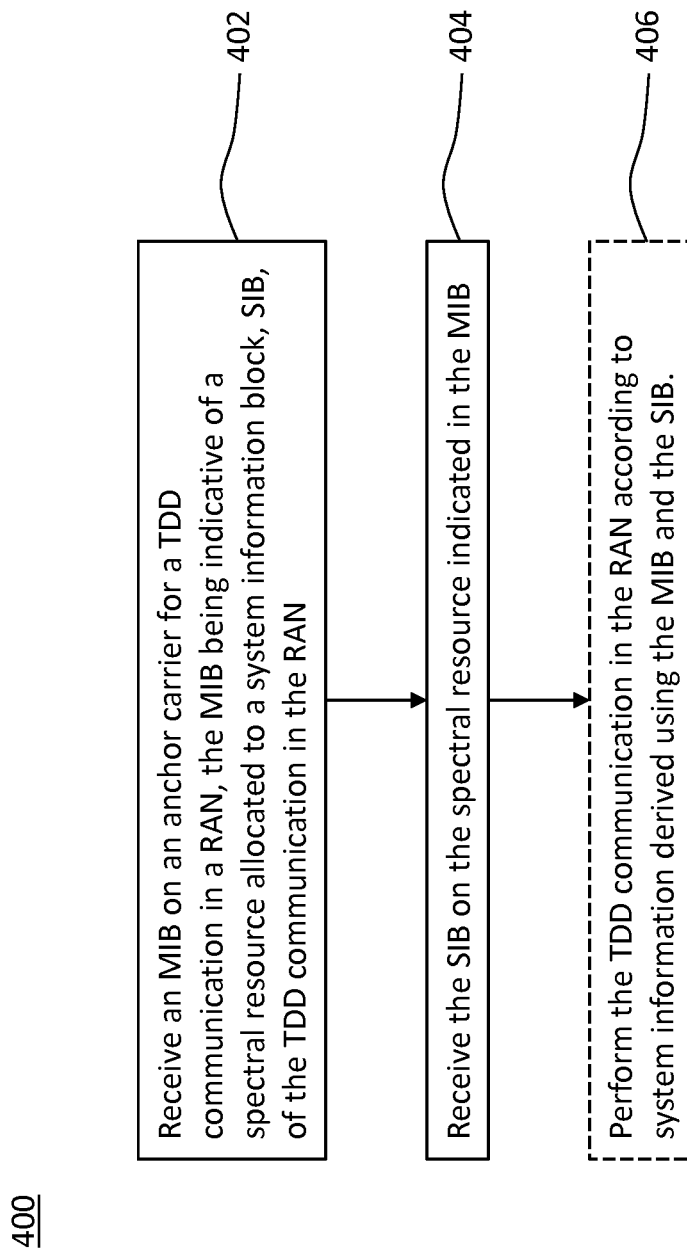
FIG. 4 shows a flowchart for a method of receiving system information for a time-division duplex communication in a radio access network, which is implementable by the device of FIG. 2.

FIG. 4 shows a flowchart for a method 400 of receiving system information for a time-division duplex (TDD) communication in a radio access network (RAN). The method comprises or triggers a step 402 of transmitting a master information block (MIB) on an anchor carrier of the TDD communication in the RAN. The MIB is indicative of a spectral resource allocated to a system information block (SIB) of the TDD communication in the RAN. In a step 404 of the method 400, the SIB is received on the spectral resource indicated in the MIB.

The system information may be derived using at least one of the transmitted MIB and the transmitted SIB. Optionally, in a step 406, the TDD communication is performed in the RAN based on the system information.

The method 400 may be performed by the device 200, e.g., at or using the radio device. For example, the modules 202 and 204 may perform the steps 402 and 404, respectively.

Any feature or step described for an embodiment of the device 100 may be implemented in the method 300, and an embodiment of the device 200 and an implementation of the method 400 may comprise a corresponding feature or step.

That is, the devices 100 and 200 as well as the methods 300 and 400 are different aspects of the technique.

The technique may enable indicating the SIB (e.g., an SIB1-NB) on a non-anchor carrier for NB-IoT TDD. A low or minimum number of bits in the MIB (e.g., an MIB-NB) may signal the spectral resource (e.g., the non-anchor carrier position) that carries the SIB (e.g., the SIB1-NB) and provide the flexibility to reduce the impact on a coexisting mobile broadband (MBB) system (e.g., a legacy LTE system).

By applying the technique, the network (e.g., the RAN and/or a core network connected to the RAN) can indicate to the radio devices (e.g., UEs) a non-anchor carrier on which the SIB (e.g., SIB1-NB) is transmitted, with a few SIB-dedicated bits in the MIB (e.g., the MIB-NB).

The technique allows using a common format for the MIB (e.g., the MIB-NB) for multiple (e.g. all three) deployments (e.g., NB-IoT operation modes) including at least one of an in-band deployment, a guard-band deployment and a stand-alone deployment.

The MIB (e.g., MIB-NB) for the TDD communication (e.g., for the NB-IoT TDD communication) may indicate a configuration of the carrier on which the SIB (e.g., the SIB1-NB carrier) is transmitted to assist the device 100 (e.g., the radio device, particularly the UE) to determine the SIB carrier. For example, the configuration in the MIB for the SIB carrier may consist of a field that is indicative of whether the SIB is on the anchor carrier or a non-anchor carrier. Alternatively or in addition, an extension of existing Operation Mode Information may provide a deployment-specific (e.g., operation mode dependent) configuration for the SIB.

The device 100 (e.g., the radio device, particularly the module 206) may determine the exact spectral resource (e.g., the NB-IoT non-anchor carrier), on which the SIB (e.g., the SIB1-NB) is transmitted in the step 304 and received in the step 404, based on predefined rules (e.g., specified in a 3GPP technical specification) in combination with the indication (e.g., the SIB1-NB carrier configuration) broadcasted in the MIB (e.g., the MIB-NB).

In a NB-IoT system configured for TDD, the downlink (i.e., transmission from base stations of the RAN to UEs) and the uplink (i.e., transmission from UEs to the base-stations) share the same carrier frequency in a time-division manner defined by an uplink-downlink TDD configuration.

The initial synchronization signals include a NB primary synchronization signal (NPSS) and a NB secondary synchronization signal (NSSS) signal, which are transmitted on the anchor carrier. A NB physical broadcast channel (NPBCH), which broadcasts the MIB-NB to the entire cell coverage, is also transmitted on the anchor carrier, e.g., according to the RAN1 Chairman's Notes for the 3GPP TSG RAN WG1 Meeting 90bis, Prague, CZ, 9-13 Oct. 2017.

Embodiments of the technique enable the RAN (e.g., the base-station) to transmit the SIB (e.g., the SIB1-NB), and optionally one or more other SIBs, on one or more non-anchor carriers. If the SIB is transmitted on a non-anchor carrier, the MIB (e.g., the MIB-NB) informs the UE as to the exact spectral resource of the SIB, i.e., the non-anchor carrier, so that the UE can tune its receiver to that specific carrier to receive the SIB, and optionally other SIBs.

Embodiments of the technique use the limited amounts of spare bits in the MIB to indicate the spectral resource of the SIB (e.g., the SIB1-NB carrier). By using the technique, the spectral resource for the SIB can be deployed at many possible frequency positions, e.g., with enormous flexibilities according a system definition.

As opposed to embodiments of the technique using one or few bits to indicate the spectral resource of the SIB in the MIB, a conventional way of indicating a NB-IoT non-anchor carrier as defined by 3GPP Release 14, e.g., in Section 5.7.3 of the document 3GPP TS 36.104 (e.g., Version 14.5.0), requires 23 bits including 18 bits for indicating the E-UTRA Absolute Radio Frequency Channel Number (EARFCN) and another 5 bits for the frequency offset to the carrier raster in a SIB. Such a number of bits does not fit into the MIB-NB due to the limited size of MIB-NB.

The technique may apply a tradeoff between flexibility of the spectral resource (e.g., the SIB1-NB position in the frequency domain) and the number of bits indicative of the spectral resource in the MIB. By predefining the spectral resource (e.g., the position of the non-anchor carrier) that carries the SIB (e.g., the SIB1-NB) or by predefining few candidates for the spectral resource, the number of bits used in the MIB can be minimized.

The SIB may be a SIB type 1 or SIB1, e.g., compatible with a SystemInformationBlockType1-NB (SIB1-NB) specified in the document 3GPP TS 36.331 (e.g., version 14.4.0). The transmission of the MIB and/or transmission of the SIB may be broadcasts. The system information may include at least one of the MIB and the SIB.

By indicating, in the MIB, the spectral resource carrying the SIB (e.g., SIB1), sufficient system information for flexibly configuring the TDD communication can be transmitted without a disproportionate signaling overhead caused by the MIB on the anchor carrier. For example, the same structure or size of the MIB may be transmitted in different or all deployment modes and/or in different or all uplink-downlink TDD configurations, including an uplink-downlink configuration with rare or minimal downlink resources.

In one implementation, it may be not possible to transmit in the downlink on the non-anchor carrier in a subframe configured for the uplink according to the uplink-downlink-TDD configuration. In other words, the same uplink-downlink configuration may apply to both anchor and non-anchor carriers in some implementations.

The spectral resource may be indicated in the frequency domain, e.g., as a center frequency, a subcarrier, a frequency range and/or one or more physical resource blocks (PRBs).

The spectral resource may include at least one non-anchor carrier that is used for the transmission of the SIB, the non-anchor carrier being different from the anchor carrier. More than one non-anchor carrier may be used to boost the capacity.

The anchor carrier may also be referred to as a primary carrier. The non-anchor carrier may also be referred to as a secondary carrier. The non-anchor carrier may be non-overlapping with and/or neighboring (e.g., adjacent) to the anchor carrier.

The MIB may be indicative of whether the spectral resource is on the anchor carrier or on a carrier other than the anchor carrier. The MIB may be indicative of whether the spectral resource (e.g., the transmission of the SIB) is on the anchor carrier or the non-anchor carrier.

The MIB may include at least one parameter value or indicator that is indicative of the spectral resource. For example, the MIB may include an index value and/or a bit field indicative of (e.g., referring to) the frequency, the subcarrier, the frequency range and/or the one or more PRB. The MIB may be indicative of an absolute frequency and/or an absolute frequency range for the spectral resource. Alternatively or in combination, the MIB may be indicative of a relative position and/or size (e.g., a relative position of the frequency, the subcarrier, the frequency range and/or the one or more PRBs) of the spectral resource.

The MIB may be indicative of the spectral resource relative to the anchor carrier. Alternatively or in combination, the MIB may be indicative of the spectral resource in terms of physical resource blocks (PRBs).

The MIB may be indicative of the spectral resource with reference to a raster of PRBs. At least one of a center frequency and a bandwidth of the spectral resource may be indicated in terms of the PRBs.

The method may further comprise or trigger a step of transmitting initial synchronization signals on the anchor carrier for the TDD communication in the RAN. The initial synchronization signals may include at least one of primary synchronization signals (PSS, e.g., NB PSS or NPSS) and secondary synchronization signals (SSS, e.g., NB SSS or NSSS) of the RAN.

The transmissions on the anchor carrier and/or the non-anchor carrier may be governed by an uplink-downlink configuration of the TDD communication in the RAN. The uplink-downlink configuration of the TDD communication may associate subframes of the TDD communication with a communication direction. The uplink-downlink configuration of the TDD communication may be compatible with those in the 3GPP document TS 36.211, Table 4.2-2 (e.g., version 14.4.0) for frame structure type 2. For example, the uplink-downlink configuration of the TDD communication in the RAN may be determined from a subset of the uplink-downlink configuration.

The method may further comprise or trigger a step of selectively transmitting and receiving payload data on the anchor channel according the uplink-downlink configuration of the TDD communication in the RAN.

The system information (e.g., MIB or SIB) and/or a downlink control information (DCI) may be indicative of the uplink-downlink TDD configuration. There may be 6 or 7 uplink-downlink TDD configurations, one of which may be configured at the radio device by indicating the corresponding configuration in the MIB, the SIB (e.g., SIB1) or in the DCI. The uplink-downlink TDD configurations may be compatible with those defined in the document 3GPP TS 36.331 (e.g., version 14.4.0).

Furthermore, different uplink-downlink TDD configurations may be applied to different carriers. The anchor carrier and the one or more non-anchor carriers may use different uplink-downlink TDD configurations. Such different uplink-downlink TDD configurations may be indicated in the MIB. Alternatively or in addition, if a SIB1 scheduling is the same for all uplink-downlink TDD configuration (e.g., in subframe #0 and/or subframe #1), then the uplink-downlink TDD configuration may be included in SIB1. Otherwise the uplink-downlink TDD configuration may be included in the MIB.

The TDD communication in the RAN may be a narrowband (NB) radio communication involving NB devices. The NB devices may also be referred to as NB radio devices or NB Internet-of-Things (IoT) devices, i.e., NB-IoT devices. The NB-IoT devices may perform a random access procedure with the RAN based on at least one of the initial synchronization signals, the MIB and the SIB. For example, the RAN may receive a random access preamble from a NB-IoT device.

At least one of the system information (SI), the MIB and the SIB may refer to the NB communication. At least one of the SI, the MIB and the SIB may be referred to as SI-NB, MIB-NB and SIB-NB, respectively.

A system bandwidth of the NB communication (i.e., the NB system bandwidth) may be equal to or (e.g., significantly) less than a coherence bandwidth of the NB communication. The coherence bandwidth may include a statistical measurement of the range of frequencies over which a radio channel can be considered as flat, or a bandwidth or frequency interval over which two frequency components of a radio signal are likely to experience comparable or correlated (e.g., amplitude) fading. The NB system bandwidth (e.g., the UE bandwidth) may encompass at least one of the anchor carrier and the non-anchor carrier. The NB bandwidth may be 200 kHz (or 1 PRB as useful bandwidth) for the NB communication. More specifically, from the NB radio device perspective, the NB bandwidth may be smaller than the coherent bandwidth of the NB communication. Furthermore, the RAN may configure several non-anchors carriers at different positions, in which case the correlation may be faded.

The RAN may further provide radio access to mobile broadband (MBB) devices for a MBB communication in a MBB system bandwidth of the RAN, a NB used by the NB communication being deployed within the MBB system bandwidth or in a guard-band of the MBB system bandwidth.

The system bandwidth of the MBB communication (i.e., the MBB system bandwidth) may be (e.g., multiple times) greater than the NB system bandwidth used by the NB communication. Alternatively or in combination, the MBB system bandwidth may encompass at least or more than the bandwidth of 6 PRBs to communicate to one radio device (e.g., UE).

The MBB system bandwidth may (e.g., significantly) exceed a coherence bandwidth of the MBB communication, e.g., the coherence bandwidth of a MBB channel used by the MBB communication. A transfer function of the MBB channel may be frequency-dependent within the MBB system bandwidth.

The MBB devices and the NB IoT devices may coexist within a coverage region (e.g., a cell or sector) of the RAN. A NB-IoT device may be configured to transmit and/or receive in the NB system bandwidth. The NB system bandwidth may correspond to one or few (e.g., 2 or 3) PRBs, 1 to 12 subcarriers and/or 15 kHz to 180 kHz or 200 kHz. A MBB device may be configured to transmit and receive in the MBB system bandwidth corresponding to multiple PRBs, more than 12 subcarriers and/or more than 180 kHz or 200 kHz.

The MBB communication may use frequency-division duplexing (FDD) or TDD. In the case of TDD for the MBB communication, the same uplink-downlink configuration may be applied to both the NB communication and MBB communication in the RAN.

Furthermore, the non-anchor carrier may be (e.g., selectively) used for both uplink and downlink.

The NB system bandwidth may encompass at least one of the anchor carrier and the non-anchor carrier. The one or more non-anchor carriers may be arranged in any PRB of the MBB system, e.g., except the center 6 PRBs in the LTE system.

PRBs for the MBB communication may be arranged in the frequency domain according to a PRB scheme. Alternatively or in addition, the anchor carrier for the NB communication may be arranged in the frequency domain according to a carrier raster. A PRB spacing of the PRB scheme may be greater than a carrier spacing of the carrier raster. The PRB spacing may be 180 kHz. The carrier spacing may be 100 kHz.

The anchor carrier may use a PRB according to the PRB scheme. An offset between a center frequency of the PRB and a carrier of the carrier raster may be equal to or less than 7.5 kHz and/or half of a subcarrier spacing. The subcarrier spacing may be 15 kHz. The offset may be equal to or less than 7.5 kHz or 2.5 kHz. For example, the offset may be small enough so that the NB-IoT device detects the anchor carrier even though it is scanning on the carrier raster. For example, a frequency of the anchor carrier may be near a least common multiple of the PRB spacing and the carrier spacing.

The non-anchor carrier may use another PRB according to the PRB scheme next to the PRB of the anchor carrier. The PRB next to the one of the anchor carrier may be neighboring or adjacent to the PRB of the anchor carrier.

At least one of the anchor carrier and the non-anchor carrier of the NB communication may be located in one or more guard-bands of the MBB system bandwidth. The MIB may be indicative of whether the anchor carrier and the non-anchor carrier are located in the same guard-band of the MBB system bandwidth or opposing guard-bands of the MBB system bandwidth.

The anchor carrier may be closer to a frequency edge of the MBB system bandwidth. Alternatively or in combination, the anchor carrier may be equal to or located at a frequency edge of the MBB system bandwidth.

Alternatively or in addition, the anchor carrier may be closer to a MBB carrier frequency than the non-anchor carrier, or the anchor carrier and the non-anchor carrier may be symmetrically arranged in the frequency domain relative to the MBB carrier frequency.

The anchor carrier may be arranged between the MBB system bandwidth and the non-anchor carrier. For example, the MIB may be indicative of whether non-anchor carrier for transmitting the SIB corresponds to a PRB next or second-next to the frequency-edge of the MBB system bandwidth of the RAN.

The MIB may be indicative of whether the non-anchor carrier used for transmitting the SIB is located at a guard-band at the lower-frequency edge of the MBB system bandwidth or at a guard-band at the higher-frequency edge of the MBB system bandwidth.

The MIB may be indicative of whether the non-anchor carrier used for transmitting the SIB is located at a frequency lower than the lower-frequency edge of the MBB system bandwidth or at a frequency higher than a higher-frequency edge of the MBB system bandwidth.

At least one of the anchor carrier and the non-anchor carrier of the NB communication may be located within the MBB system bandwidth. At least one of the anchor carrier and the spectral resource used for transmitting the SIB of the NB communication may be located within the MBB system bandwidth.

The MIB may be indicative of whether the spectral resource used for transmitting the SIB is arranged in a PRB adjacent to a lower-frequency edge or a higher-frequency edge of a PRB used by the anchor carrier.

Alternatively or in addition, the MIB may be indicative of a subframe used (e.g., on the anchor carrier) for transmitting the SIB.

A 3GPP NB-IoT implementation of technique for the NB communication may be compatible with a NB system being defined by 3GPP for cellular Internet of Things (IoT). The NB system provides access to network services using a physical layer optimized for very low power consumption. The full carrier bandwidth of the NB may be 180 kHz, and subcarrier spacing may be 3.75 kHz or 15 kHz. The NB system may be based on existing MBB systems (e.g., LTE systems) and addresses optimized network architecture and improved indoor coverage for a massive number of NB-IoT radio devices (also referred to as NB radio device or NB-IoT device).

Any NB-IoT radio devices may include at least one of the following characteristics. A first characteristic may include a low throughput of the NB-IoT radio device, e.g., 2 kbps or less. A second characteristic may include a low sensitivity for delay or latency, e.g., for delay or latency on the order of 10 seconds or more than seconds. A third characteristic may include low costs for manufacturing the NB-IoT radio device, e.g., below 5 dollars. A fourth characteristic may include a low power consumption of the NB-IoT device, e.g., for a battery life on the order of 10 years or more.

Figure 5:
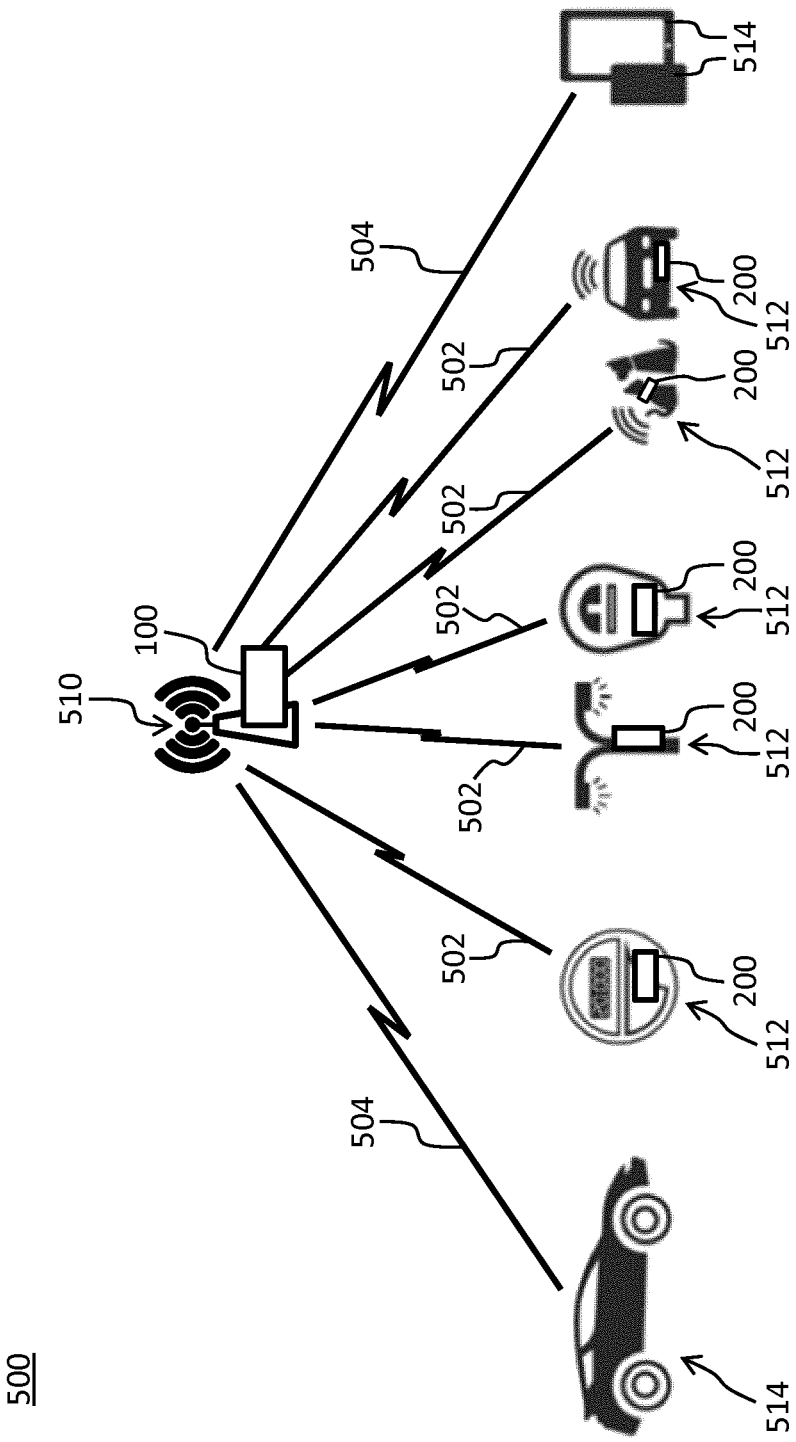
FIG. 5 schematically illustrates an exemplary radio access network for deploying any of the devices of FIGS. 1 and 2.

FIG. 5 schematically illustrates an embodiment of the RAN 500, in which the technique may be implemented. The RAN 500 comprises at least one embodiment of the device 100, e.g., at a base station 510. The TDD communication involves at least one NB TDD communication 502 with a NB radio device 512. Each of the radio devices 512 embodies the device 200. As schematically illustrated in FIG. 5, the NB communication 502 may coexist with a mobile broadband (MBB) communication 504 involving MBB radio devices 514.

Without limitation to the RAN 500 schematically illustrated in FIG. 5, a carrier bandwidth of the NB communication 502 may be 180 kHz or less, e.g., as opposed to a bandwidth of the MBB communication 504. The anchor carrier or any carrier of the NB communication may be used (e.g., for the uplink) in a first mode with a single subcarrier (or tone) with 15 kHz and/or 3.75 kHz subcarrier spacing, or in a second mode with multiple-subcarrier (or multiple-tone) transmissions with 15 kHz subcarrier spacing. Furthermore, the NB communication does, e.g., not support a turbo code for the downlink, e.g., as opposed to the MBB communication.

Examples for the MBB radio devices 514 include a mobile station such as mobile phone or a tablet computer and a portable station such as a laptop computer or a television set. Examples for the NB radio devices 512 include robots, sensors and/or actuators, e.g., in manufacturing, automotive communication and home automation.

The NB radio device may be implemented in household appliances and consumer electronics. Embodiments of a combination of a MBB radio device 514 and NB radio device 512 may include a self-driving vehicle, a door intercommunication system and an automated teller machine.

Examples for the base station 510 may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN 500 may be compatible with the Global System for Mobile Communications (GSM), the Universal Mobile Telecommunications System (UMTS), Long Term Evolution (LTE) and/or 5G New Radio (NR).

Aspects of the technique may be implemented on a Physical Layer (PHY), a Medium Access Control (MAC) layer, a Radio Link Control (RLC) layer and/or a Radio Resource Control (RRC) layer of a protocol stack for the radio communication.

Each base station 510 of the RAN 500 may provide radio access in one or more cells or sectors. A coverage area of each cell or sector may be on the order of 1 km$^2$ (1 square kilometer). Each cell or sector may serve thousands (e.g., more than 10 thousand or on the order of 50 thousand) NB-IoT radio devices, such as sensors, meters, actuators, etc. The narrow bandwidth 612 of the NB 602 can make use of existing spectrum, e.g. of GSM. That is, the NB 602 may be deployed on the GSM spectrum. The carrier raster of the NB-IoT system including frequency steps of 100 kHz may be congruent with a 200 kHz raster for GSM.

Figure 6:
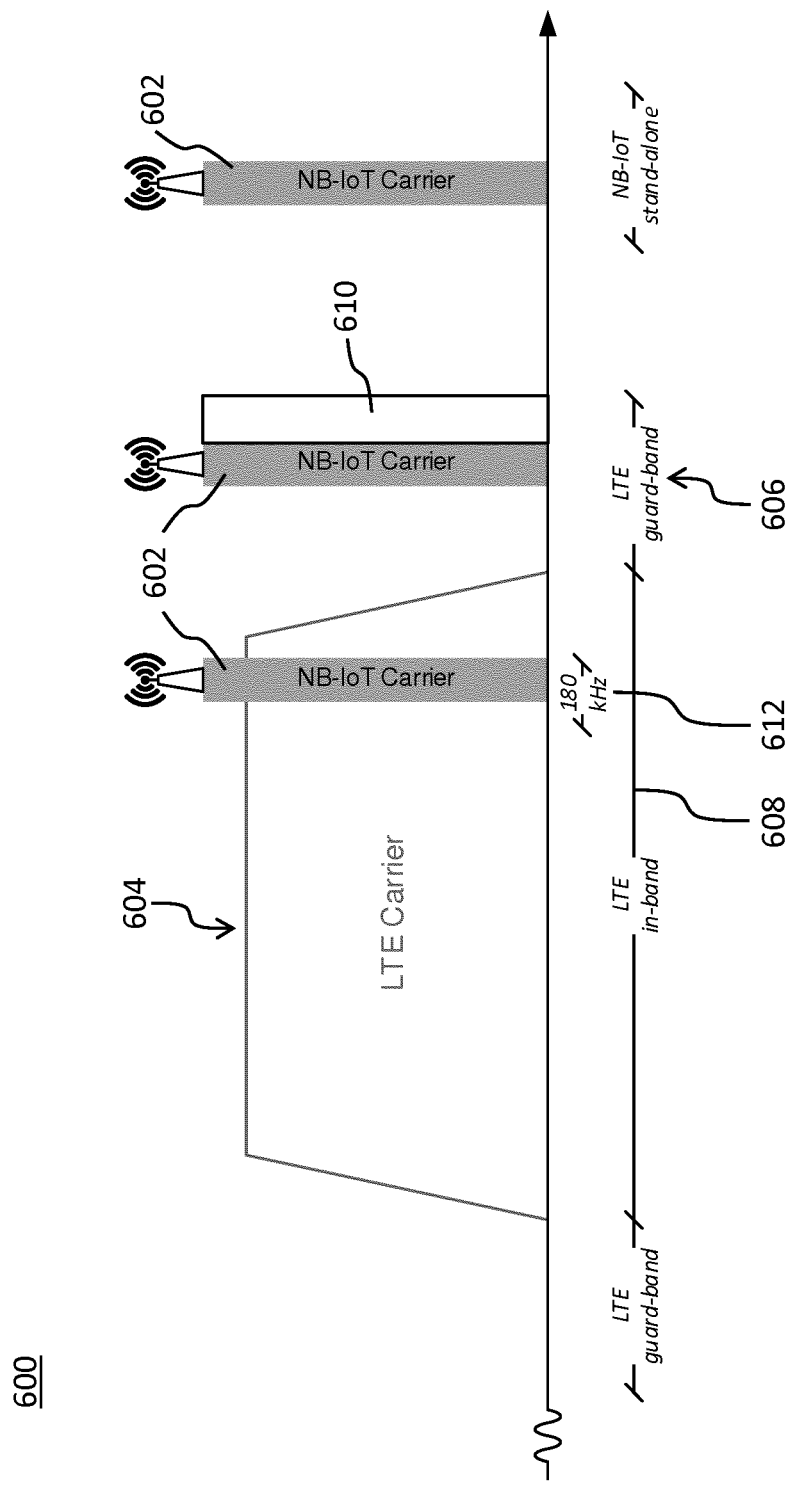
FIG. 6 schematically illustrates a first example of a frequency band usable in the RAN of FIG. 5.

FIG. 6 schematically illustrates a first example of a frequency band 600 that is used for radio communication in the RAN 500, e.g., according to the exemplary RAN 500 illustrated in FIG. 5. The NB 602, i.e., the portion of the frequency band 600 used for the NB TDD communication 502, may be deployed differently relative to, or independently of, the MBB 604 used or available for the MBB communication 504.

For clarity and without limitation, one NB-IoT carrier is illustrated in FIG. 6 as the NB 602. Each NB-IoT carrier may occupy a bandwidth of 180 kHz, e.g., corresponding to one PRB of the MBB 604 being allocated to the NB TDD communication 502.

The illustrated NB-IoT carrier 602 may be used as the anchor carrier of the NB TDD communication 602. Alternatively, one or more non-anchor carriers may be deployed as schematically illustrated at one or more of the reference signs 602. Furthermore, the anchor carrier and the one or more non-anchor carriers may be arranged (e.g., next to each other) at one or more of the reference signs 602.

FIG. 6 schematically depicts deployments (also: referred to as operation modes) of the NB 602, e.g., the anchor carrier and/or non-anchor carrier. The deployments include, as schematically illustrated from left to right, an in-band deployment, a guard-band deployment and a standalone deployment. The NB 602 is deployed in-band with the MBB 604, if the NB 602 is within the MBB 604 used or available for the MBB communication 504. In the guard-band deployment, the NB 602 is located in a guard-band 606 of the MBB 604. In the standalone deployment, the NB 602 is located in a NB-dedicated frequency range, e.g., in the absence of an MBB 604 or the NB-dedicated frequency range is independent of a coexisting MBB 604.

The three different operation modes (i.e., standalone, guard-band, and in-band) may be compatible with 3GPP RP-152284 ["New Work Item: Narrowband IoT (NB-IoT)", Huawei and HiSilicon, RAN #70]. In the standalone deployment, the NB-IoT system is operated in dedicated frequency bands. For the in-band deployment, the NB 602 is placed inside the frequency bands 604 used by or available for a coexisting MBB system (e.g., an LTE system). In the guard-band deployment, the NB 602 is placed in the guard-band 606 of the coexisting MBB system (e.g., an LTE system), i.e., near the edges of the MBB 604, as schematically illustrated in FIG. 6.

The NB-IoT system may operate with a NB system bandwidth 612 of 180 kHz or a multiple thereof, e.g., for multi-carrier operation in accordance with the deployment of one or more non-anchor carriers. When multiple carriers are configured, e.g., according to 3GPP R1-161548 ["RAN1 agreements for Rel-13 NB-IoT", Work Item rapporteur Ericsson, 3GPP TSG-RAN WG1 Meeting #84, St. Julian's, Malta, Feb. 15-19, 2016], several PRBs each having a bandwidth of 180 kHz may be used, e.g., for increasing NB system capacity, for inter-cell interference coordination and/or load balancing.

Physical resource blocks (PRBs) of the MBB 604 are grouped into a resource block group (RBG) to be scheduled to a MBB radio device 514 (e.g., a UE) according to some MBB resource allocations (e.g., LTE resource allocation Type 0, which is the most commonly used resource allocation type). Depending on an MBB channel bandwidth or an MBB system bandwidth 608, the number of PRBs in each RBG varies from 1 to 4. The channel bandwidth of the MBB 604 may be defined as the bandwidth occupied by the MBB 604 including the guard bands 606. The MBB system bandwidth 608 may be defined by the transmission bandwidth configuration of the MBB 604, e.g., in units of PRBs.

For the in-band deployment of the NB TDD communication 502, the use of RBGs can fragment the MBB (e.g., LTE) resource allocation, because a narrowband reference signal (NRS) is used for the NB TDD communication 502 as downlink reference signal, which feature is absent in legacy LTE UEs. Hence, the anchor carrier and the one or more non-anchor carriers are preferably in the same RBG of the MBB 604 for the in-band deployment of the NB 602. A preferred embodiment uses all PRBs of a RBG for the NB TDD communication 502 in an in-band deployment before another RBG is used. This RBG-filling rule may also be applied to RBGs comprising only non-anchor carriers of the NB TDD communication 502.

For the guard-band deployment, the same embodiment or a further preferred embodiment places the anchor carrier and the non-anchor carrier at different band edges of the MBB 604, e.g., to fulfill a requirement limiting out-band emissions. For example, the NB 602 may be located between a residual portion 610 of the guard-band 606 and the system bandwidth 608 of the MBB 604. As a result, the complexity of a filter design can be reduced, especially if the non-anchor carrier is also power-boosted.

Figure 7:
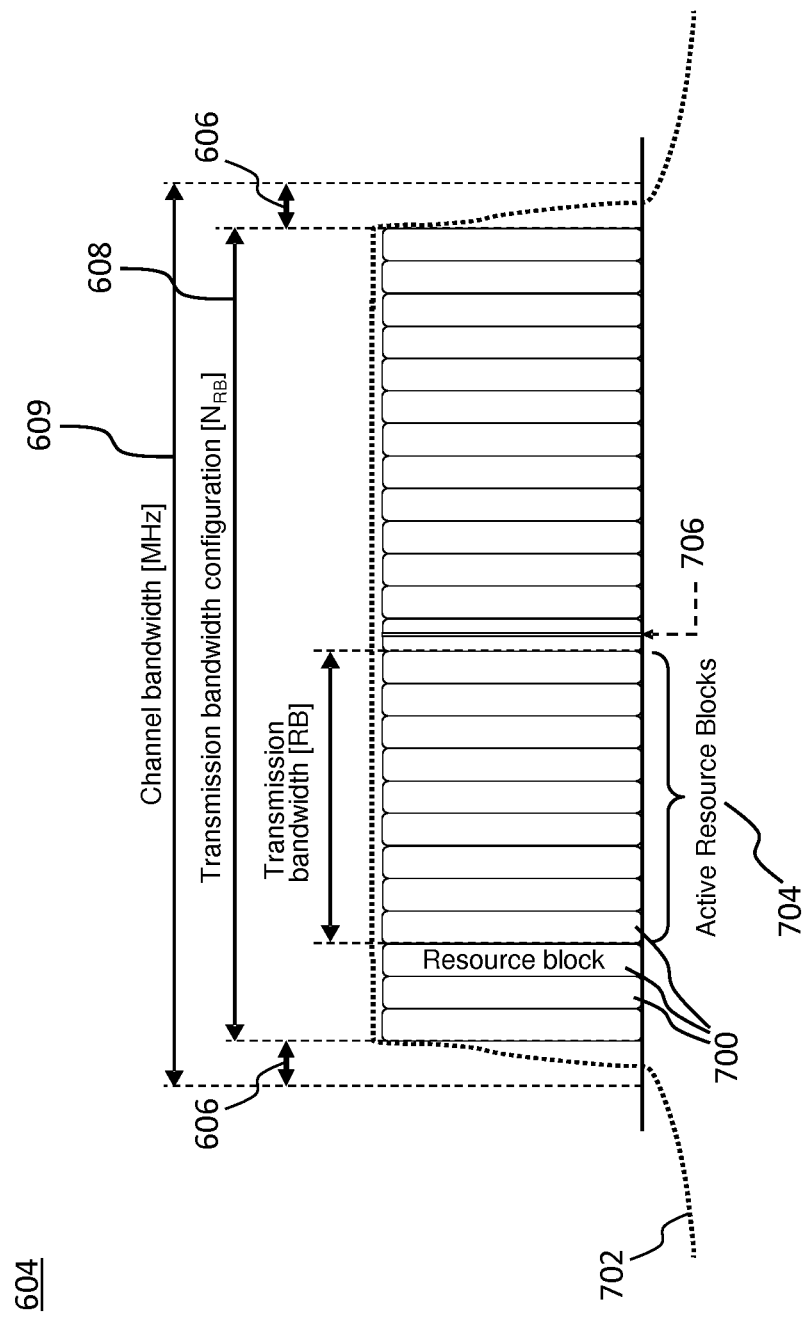
FIG. 7 schematically illustrates the frequency structure of the Mobile Broadband system of FIG. 6.

FIG. 7 schematically illustrates an exemplary frequency structure of the MBB 604, which may be part of the first example or another second example of the frequency band 600 used by the RAN 500.

The system bandwidth 608 of the MBB 604 comprises a number ($N_{RB}$) of PRBs 700 according to the transmission bandwidth configuration of the MBB 604. The limit 702 on out-band emissions is schematically illustrated. The channel bandwidth 609 encompasses both the system bandwidth 608 and the guard-bands 606. A subset 704 of the PRBs 700 is used by the MBB communication 504, so that some of the other PRBs 700 may be allocated to the NB TDD communication 502 in the in-band deployment. A center subcarrier 706, which corresponds to a direct current (DC) component in the baseband, is not transmitted in the downlink of the RAN 500.

The channel raster of the downlink of NB-IoT systems is on a frequency grid of 100 kHz. That is, the NB-IoT devices 512 search for the NB-IoT carriers (more specifically, for the anchor carrier) in a step size of 100 kHz, which may be implemented straightforwardly in the standalone deployment. For the in-band and guard-band 15 deployments, as observed in the 3GPP document RI-160082 ["NB-IoT Channel Raster", Ericsson, 3GPP TSG-RAN1 NB-IoT Ad Hoc, 18-20 Jan. 2016, Budapest, Hungary], due to the presence of the DC-carrier 706 and the fact that the center of the PRBs 700 is in between two sub-carriers of the MBB 604, there is no PRB 700 that falls directly on the NB cell search grid used in LTE in-band operation. The 20 frequency offset to the 100 kHz grid is a minimum of ±2.5 kHz and ±7.5 kHz for even and odd number of PRBs 700 in the LTE system bandwidth 608, respectively.

Figure 8:
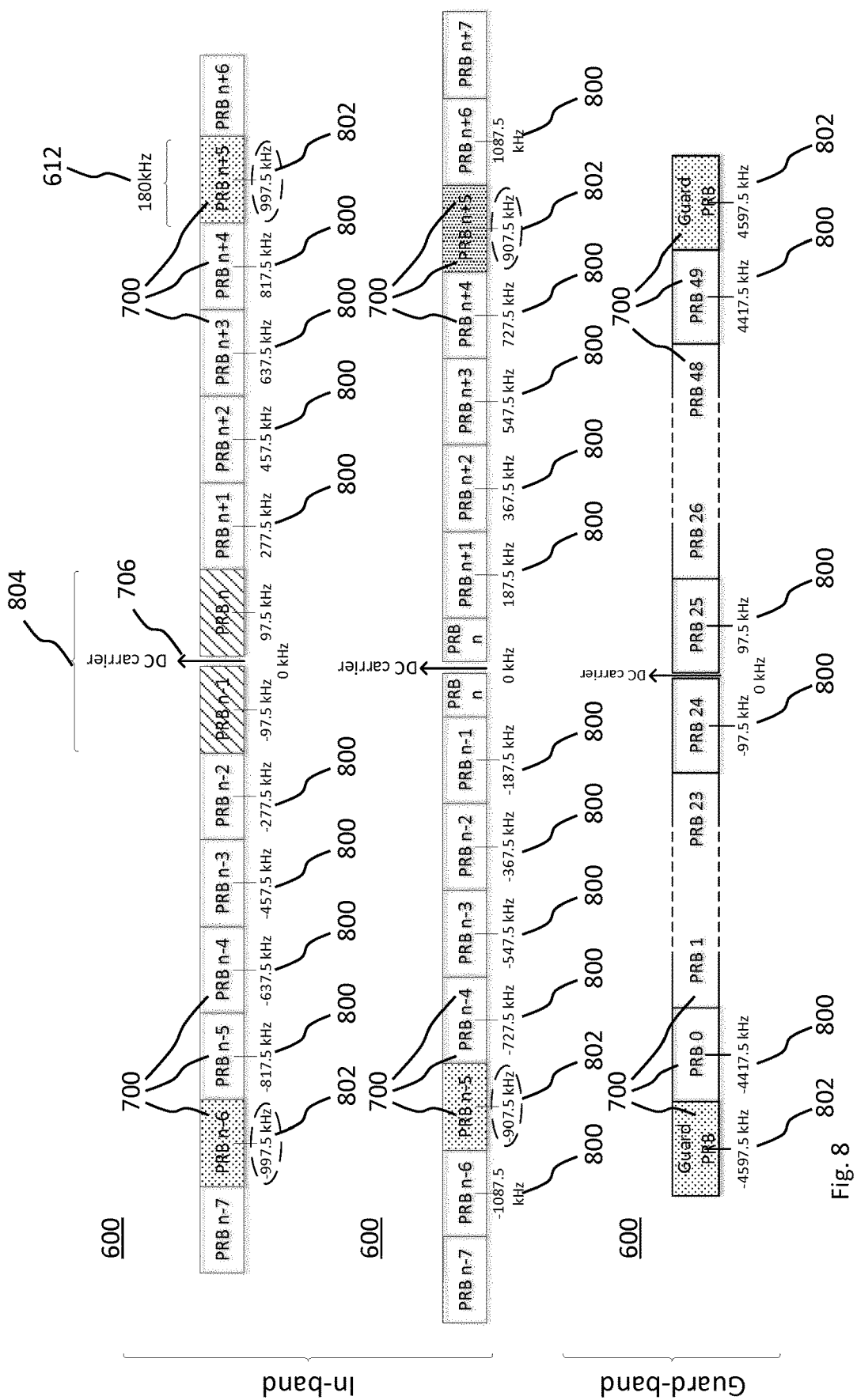
FIG. 8 schematically illustrates Center frequencies of PRBs.

Center frequencies 800 and 802 of PRBs 700 are schematically shown in FIG. 8 for in-band deployments with an even (upper row) and odd (center row) number of PRBs as well as guard-band deployments (lower row). Those center frequencies at reference signs 802 are examples of the minimum offsets. A detailed description of matching the MBB PRB structure and the NB carrier raster with minimum offsets is given in the afore-mentioned 3GPP document R1-160082 and the 3GPP document R1-160022 [Channel raster design, source Huawei, HiSilicon, 3GPP TSG-RAN1 NB-IOT Ad Hoc 18-20 Jan. 2016, Budapest, Hungary]. The minimum offset ±2.5 kHz or ±7.5 kHz can be handled by the NB radio device 512 during the cell search process and then be compensated, e.g., as discussed in the 3GPP documents R1-160080 ["NB-IoT—Synchronization Channel Evaluations", Ericsson, 3GPP TSG-RAN1 NB-IoT Ad Hoc, 18-20 Jan. 2016, Budapest, Hungary] and R1-160021 ["Synchronization signal evaluation", Huawei and HiSilicon, 3GPP TSG-RAN1 NB-IoT Ad Hoc, 18-20 Jan. 2016, Budapest, Hungary].

anchor carrier, can only be put on a center frequency that is near (in the sense of the minimum offset) one of the 100 kHz raster or grid points. Moreover, the mid 6 PRBs 804 are not allowed to be used by the NB TDD communication, since these PRBs 804 are used by the MBB, e.g., for its broadcast control channel.

Hence, an NB-IoT UE 512 is only required to search for a carrier on a 100 kHz raster. An NB-IoT carrier that is intended for facilitating NB-IoT UE initial synchronization is referred to as an anchor carrier. The 100 kHz NB-IoT UE search raster implies that for in-band deployment and guard-band deployment, the anchor carrier can only be placed in certain PRBs 700 at center frequencies 802. The NB-IoT anchor carrier in such deployments needs to have a center frequency 802 no more than 7.5 kHz from the 100 kHz raster. NB-IoT cell search and initial acquisition performed by the NB UE 512 are capable of synchronizing with the RAN 500 in the presence of a raster offset up to ±7.5 kHz.

Multi-carrier operation of NB-IoT is supported in the NB TDD communication 502 based on the MIB, and optionally based on subsequently transmitted one or more SIBs. Since it suffices to have one NB-IoT anchor carrier for facilitating UE initial synchronization, the additional carriers do not need to be centered near the 100 kHz raster. These additional carriers are referred to as secondary or non-anchor carriers.

The technique may be implemented in accordance with further enhancements of NB-IoT (feNB-oT) under a work item in the 3GPP document RP-171428, ["NB_IOTenh2, Revised WID on Further NB-IoT enhancements", Huawei and HiSilicon, 3GPP TSG RAN Meeting #76, West Palm Beach, USA, Jun. 5-8, 2017].

The MBB channel bandwidth 609 may be related to the number of $N_{RB}$ PRBs, i.e., the transmission bandwidth 608 according to Table 5.6-1 of the document 3GPP TS 36.106 (e.g., Version 14.0.0) or according to below table.

|  | MBB Channel bandwidth (MBB $BW_{Channel}$) 609 | | | | |
| --- | --- | --- | --- | --- | --- |
|  | 3 MHz | 5 MHz | 10 MHz | 15 MHz | 20 MHz |
| MBB transmission bandwidth configuration 608, i.e., $N_{RB}$ | 15 PRBs | 25 PRBs | 50 PRBs | 75 PRBs | 100 PRBs |

Indices of exemplary PRBs usable as the anchor carrier in an in-band deployment of the NB 602, e.g., for NB-IoT fully operational cell deployment, are outlined in below table.

|  | MBB Channel bandwidth 609 | | | | |
| --- | --- | --- | --- | --- | --- |
|  | 3 MHz | 5 MHz | 10 MHz | 15 MHz | 20 MHz |
| PRB indices for anchor charrier of NB communication | 2, 12 | 2, 7, 17, 22 | 4, 9, 14, 19, 30, 35, 40, 45 | 2, 7, 12, 17, 22, 27, 32, 42, 47, 52, 57, 62, 67, 72 | 4, 9, 14, 19, 24, 29, 34, 39, 44, 55, 60, 65, 70, 75, 80, 85, 90, 95 |

The minimum offsets define constraints on the positions where NB-IoT carriers (more specifically: anchor carriers) can be deployed for the in-band and guard-band operations. Therefore, a NB-IoT downlink carrier that contains synchronization signals and some of the system information, i.e., the Herein, the expression "fully operation cell" may or may not be terminology used by a 3GPP specification. It is used for a concise and clear understanding of the disclosure. The expression refers to a cell that provides radio access to an NB-IoT UE 512. That is, the cell provides an anchor carrier on the raster that the NB-IoT UE 512 initially searches for. The anchor carrier provides all necessary information for the radio access (e.g., synchronization signals, reference symbols and/or broadcast information) and can be used for dedicated NB TDD communication 502.

Figure 9:
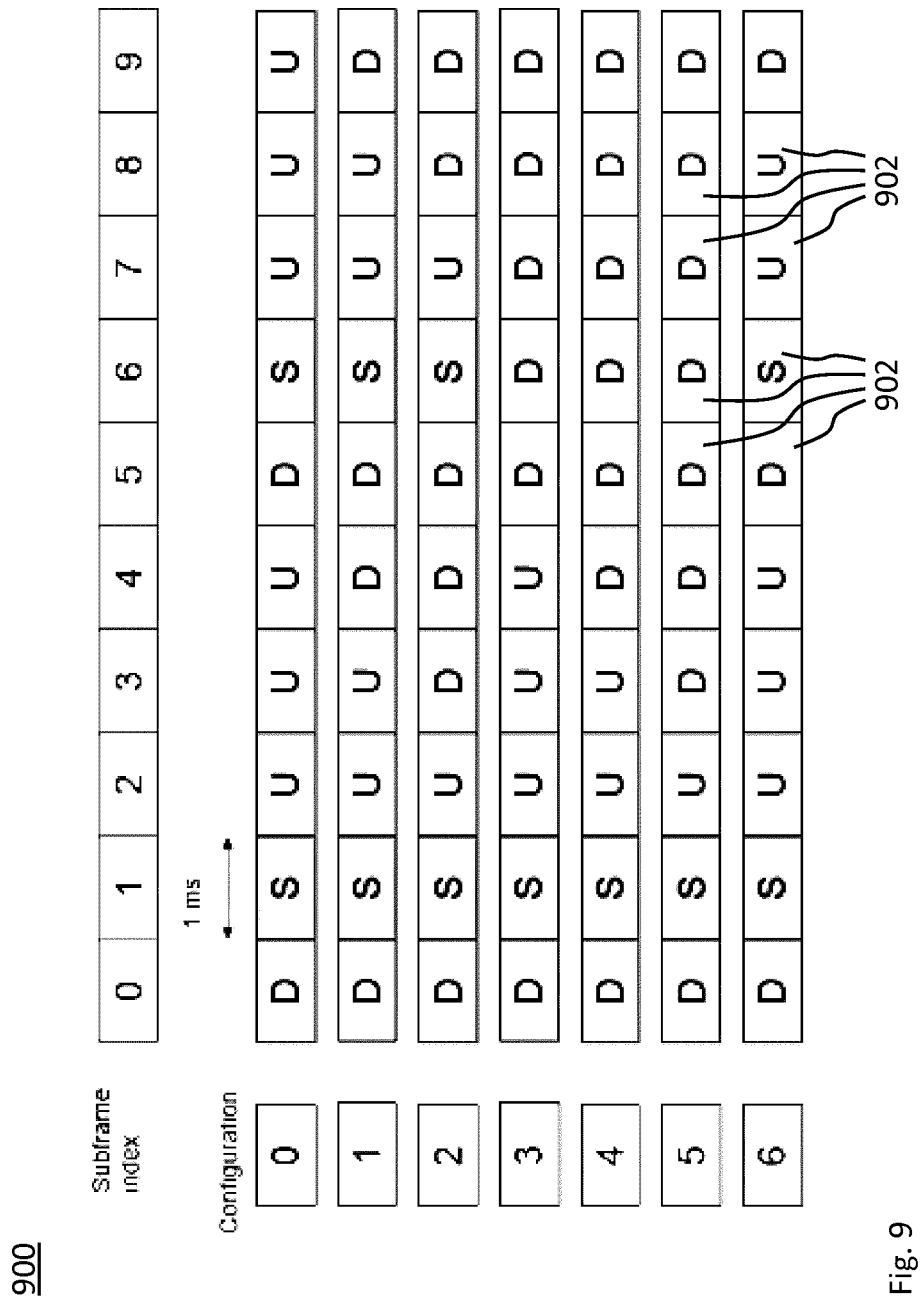
FIG. 9 schematically illustrates a set of uplink-downlink TDD configurations.

FIG. 9 schematically illustrates a set of uplink-downlink TDD configurations 900. Each row represents a different uplink-downlink TDD configuration 900, which is indicated by a corresponding index displayed at the left-hand side of FIG. 9. Time increases from left to right in each row.

Each box represents one subframe 902. A subframe labeled "D" is used for downlink communication, a subframe label "U" is used for uplink communication and a subframe labeled "S" is split including portions for downlink and uplink communications.

At least a subset of the schematically illustrated uplink-downlink TDD configurations 900 may be use for the NB TDD communication 502 and/or the MBB communication 504, e.g. in an LTE-TDD radio frame.

The technique enables TDD in the NB 602. TDD is supported in conjunction with in-band, guard-band and standalone operation modes of the NB 602. In a first implementation, the NB UE 512 needs no uplink compensation gaps. In a second implementation, which is combinable with the first implementation and any embodiment described herein, a common message format (e.g. for the MIB) is used for the deployment modes. Furthermore, the limits on a maximum coupling loss (MCL), latency and/or capacity targets may be relaxed for the NB communication 502 as compared to the MBB communication 504 and/or existing NB-IoT system (e.g., according to 3GPP Release 13). Alternatively or additionally, a third implementation may include small-cells scenarios for the NB communication 502.

In LTE-TDD, as a non-limiting example for MBB 604, in order to support flexible downlink and uplink partitioning, several configurations are supported, as shown in FIG. 9. Each of the uplink-downlink TDD configurations 900 has different numbers of uplink and downlink subframes 902. To coexist with LTE-TDD 604 in the in-band and guard-band operation modes, NB-IoT TDD 602 is preferably configured with the same uplink-downlink configuration as the one being used by LTE-TDD. Furthermore, e.g., the LTE-TDD UL-DL configuration #0 in FIG. 9 is not supported in an embodiment of the technique (i.e., in an example NB-IoT TDD system). Optionally, the subset of NB-supported configurations out of the uplink-downlink TDD configurations 900 for the MBB 604 may be further reduced [cf. RAN1 Chairman's Notes, 3GPP TSG RAN WG1 Meeting 90bis, Prague, CZ, 9-13 Oct. 2017]. Any embodiment described herein may be implemented to support all the LTE-TDD configurations 900, except LTE-TDD UL-DL configuration #0. Preferably, the NB TDD communication 502 uses, when operated as in-band or guard-band deployment, one of the uplink-downlink TDD configurations 900 compatible with the coexisting MBB 604 (e.g., LTE-TDD configurations).

As in the other cellular networks such as GSM, WCDMA and LTE, to access to the RAN 500 as a NB-IoT network, a UE 512 firstly starts a cell search procedure. The UE 512 performs the NPSS and NSSS detection to achieve frequency and time synchronization towards the RAN 500. This is done on the anchor carrier. A relative time position of the NSSS with respect to the NPSS implicitly indicates whether the NB-IoT system operates in FDD mode or TDD mode, e.g., according to the afore-cited RAN1 Chairman's Notes.

After the frequency and time synchronization is achieved and the FDD or TDD mode is known, the NB UE 512 proceeds to receive in the step 402 a NB physical broadcast channel (NPBCH) on the anchor carrier to acquire MIB-NB, which contains preliminary cell information and scheduling information for SIB1-NB transmission as the spectral resource of the SIB. After MIB-NB is acquired, the NB UE 512 receives in the step 404 the SIB1-NB according the scheduling, i.e., on the spectral resource indicated in the MIB-NB. Optionally, the SIB1-NB in-turn indicates a spectral resource (e.g., a scheduling information) for receiving further System Information Blocks (SIBs). After all the relevant system information has been acquired, the NB UE 512 start to access the network service according to the other procedures defined in the 3GPP specifications for NB-IoT.

In the NB-IoT TDD system, after acquisition of the MIB-NB in the step 402, the NB UE 512 determines whether the SIB1-NB is transmitted on the anchor carrier (i.e., the NB-IoT carrier on which the NB UE 512 detects NPSS and NSSS and decodes NPBCH) as the spectral resource allocated to the SIB or on a non-anchor carrier as the spectral resource allocated to the SIB. If the SIB1-NB is transmitted on a non-anchor carrier, the NB UE 512 determines the exact location of the non-anchor carrier on which SIB1-NB is transmitted. In one variant of any embodiment, this information is provided in the MIB-NB by indicating the spectral resource allocated to the SIB. In another variant of any embodiment, this information is predefined (e.g., hard-coded).

Below Abstract Syntax Notation One (ASN.1) is a definition of an MIB-NB according to 3GPP Release 14 for NB-IoT in the Frequency-Division Duplexing (FDD) mode. This MIB-NB may serve as a non-limiting starting point for illustrating the subject technique. A later specification for the NB TDD communication 502 may use a different definition of the MIB-NB, e.g., the MIB-NB may comprise a subset of the parameters indicated below.

The MIB-NB transmitted and received according to the steps 302 and 402, respectively, for the NB TDD communication 502 may comprise at least some of the below parameters and at least one of the further parameters emphasized in bold type further below for indicating the spectral resource of the SIB.

```
-- ASN1START
MasterInformationBlock-NB ::=        SEQUENCE {
    systemFrameNumber-MSB-r13          BIT STRING (SIZE (4)),
    hyperSFN-LSB-r13                   BIT STRING (SIZE (2)),
    schedulingInfoSIB1-r13             INTEGER (0..15),
    systemInfoValueTag-r13             INTEGER (0..31),
    ab-Enabled-r13                     BOOLEAN,
    operationModeInfo-r13              CHOICE {
        inband-SamePCI-r13                 Inband-SamePCI-NB-r13,
        inband-DifferentPCI-r13            Inband-DifferentPCI-NB-r13,
```

```
        guardband-r13                        Guardband-NB-r13,
        standalone-r13                       Standalone-NB-r13
    },
        spare                                BIT STRING (SIZE (11))
}
ChannelRasterOffset-NB-r13 ::= ENUMERATED {khz-7dot5, khz-2dot5, khz2dot5, khz7dot5}
Guardband-NB-r13 ::=                 SEQUENCE {
        rasterOffset-r13                     ChannelRasterOffset-NB-r13,
        spare                                BIT STRING (SIZE (3))
}
Inband-SamePCI-NB-r13 ::=            SEQUENCE {
        eutra-CRS-SequenceInfo-r13           INTEGER (0..31)
}
Inband-DifferentPCI-NB-r13 ::=       SEQUENCE {
        eutra-NumCRS-Ports-r13               ENUMERATED {same, four},
        rasterOffset-r13                     ChannelRasterOffset-NB-r13,
        spare                                BIT STRING (SIZE (2))
}
Standalone-NB-r13 ::=                SEQUENCE {
        spare                                BIT STRING (SIZE (5))
}
-- ASN1STOP
```

Figures 10A, 10B, 10C:
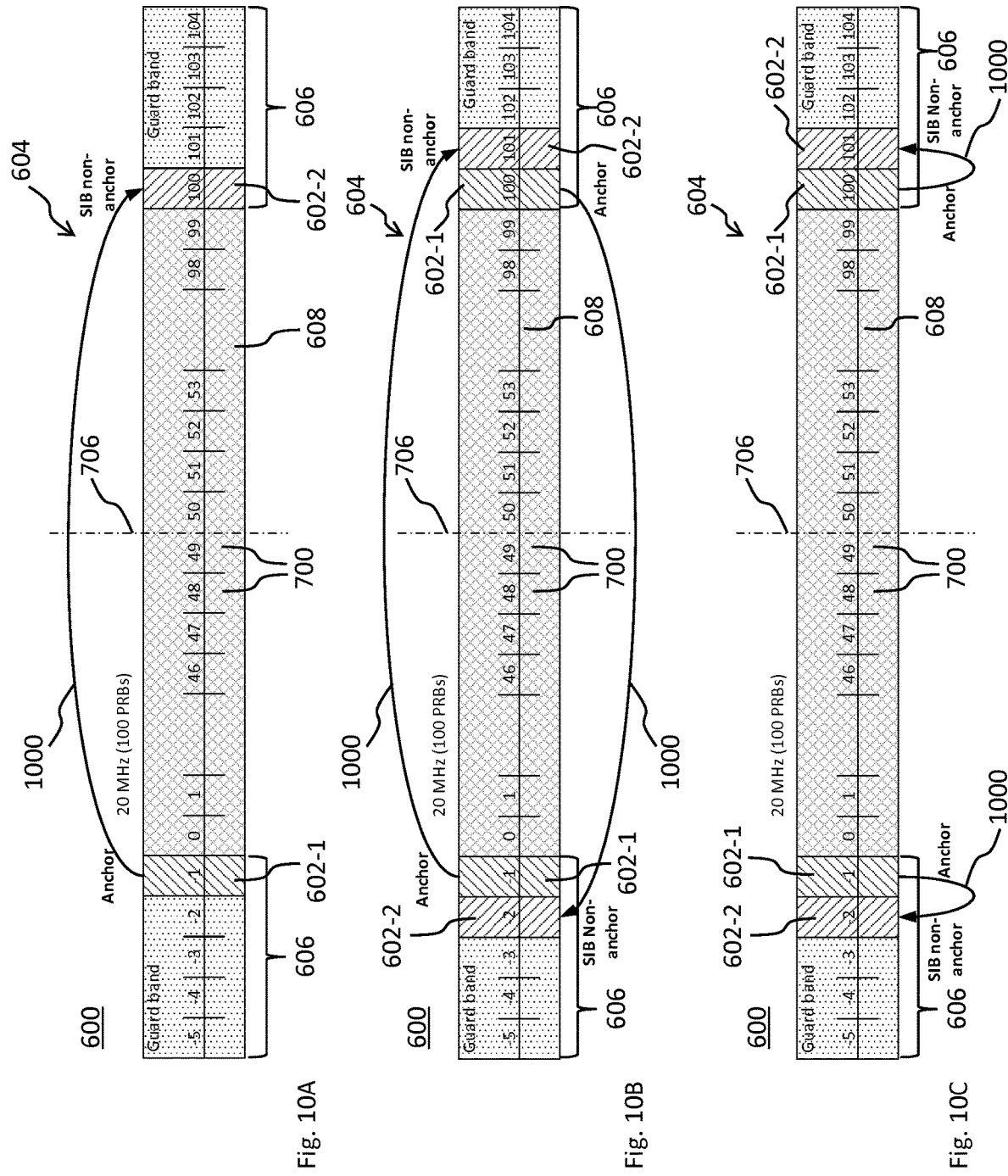
FIGS. 10A to 10C schematically illustrates a third examples of a frequency band usable in the RAN of FIG. 5.

FIGS. 10A to 10C schematically illustrates examples of the frequency band 600, each of which is usable by the RAN 500 in any embodiment. The example frequency bands 600 include an NB-IoT TDD guard-band deployment of the NB 602 relative to the LTE band 609 with a channel bandwidth of 20 MHz. Without limitation, the schedulable LTE system bandwidth 608 comprises 100 PRBs.

The NB 602 comprises an anchor carrier 602-1 and a non-anchor carrier 602-2. The MIB transmitted on the anchor carrier 602-1 in the step 302 comprises an indication 1000 of the non-anchor carrier 602-2 as the spectral resource for transmitting the SIB in the step 304. The three examples illustrated in FIGS. 10A, 10B and 10C differ in the allocation of the NB carriers 602-1 and 602-2 for implementing the NB-IoT TDD guard-band deployment.

In the example of FIG. 10A, the MIB-NB is transmitted in the step 302 on a single anchor carrier 602-1 and indicative of the SIB1-NB non-anchor carrier 602-2, i.e., the spectral resource, which is allocated at the opposite end of the MBB 604. The relative position of the NB carriers 602-1 and 602-2 is also referred to as a "mirror deployment".

In the example of FIG. 10B, the MIB-NB is transmitted according to the step 302 on each of two anchor carriers 602-1. Each MIB-NB is indicative of the SIB1-NB non-anchor carrier 602-2 (as the spectral resource for the SIB) that is allocated at the opposite end of the MBB 604 relative to the anchor carrier 602-1. This position of the NB carriers 602-1 and 602-2 relative to the center DC subcarrier 706 is also referred to as a "mirror deployment".

In the example of FIG. 10C, the MIB-NB is transmitted according to the step 302 on each of two anchor carriers 602-1. Each MIB-NB is indicative of the SIB1-NB non-anchor carrier 602-2 (as the spectral resource for the SIB) that is allocated at the same side of the MBB 604 at which the anchor carrier 602-1 is located. This position 15 of the NB carriers 602-1 and 602-2 relative to each other is referred to as "back-to-back deployment" (B2B).

Figure 11:
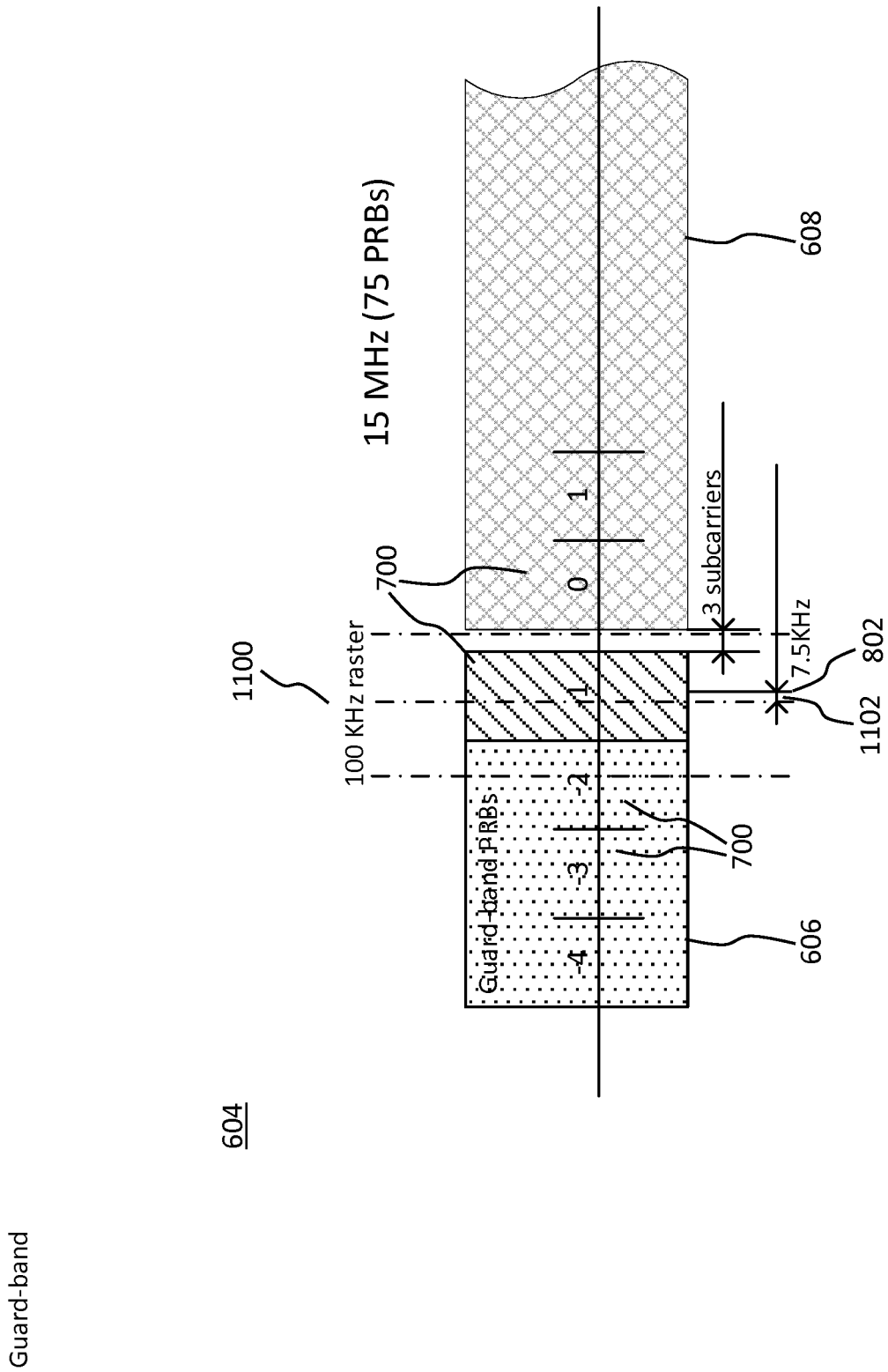
FIG. 11 schematically illustrates an example of an MBB band usable in the RAN of FIG. 5.

FIG. 11 schematically illustrates an example of the MBB 604, which is implementable at any embodiment. More specifically, the low-frequency edge of the system bandwidth 608 is shown in more detail. A symmetric frequency structure may be implemented at the opposite edge, i.e., the high-frequency edge of the system bandwidth 608. Without limitation, the LTE channel bandwidth 609 spans 15 MHz. The LTE system bandwidth 608 comprises 75 PRBs 700.

The first PRB 700 in the guard-band 606, i.e. the PRB 700 next to the LTE system bandwidth 608, is spaced apart in the frequency domain by 3 subcarriers from the first PRB 700 used or usable by the MBB 604.

The channel raster 1100 for the NB 602 comprises steps sized 100 kHz and matches up to a minimum offset 1102 (which is 7.5 kHz is the example) with the center frequency 802 of the first PRB 700 in the guard-band 606.

Figure 12A:
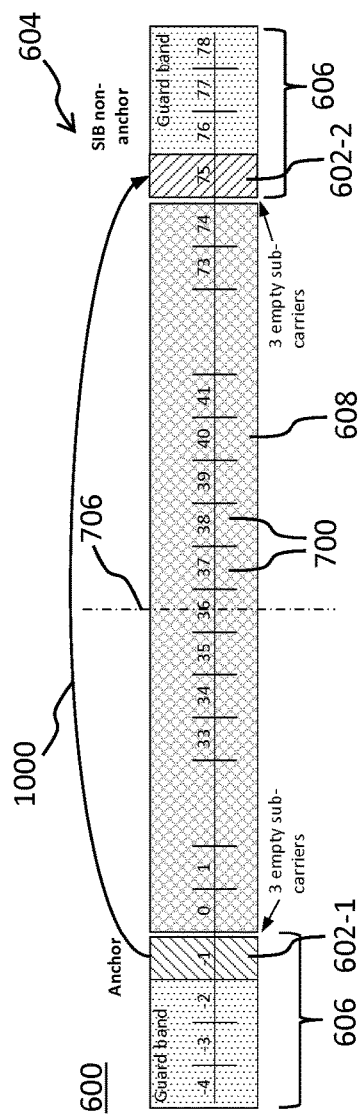
FIGS. 12A to 12C schematically illustrates fourth examples of a frequency band usable in the RAN of FIG. 5.
Figure 12B:
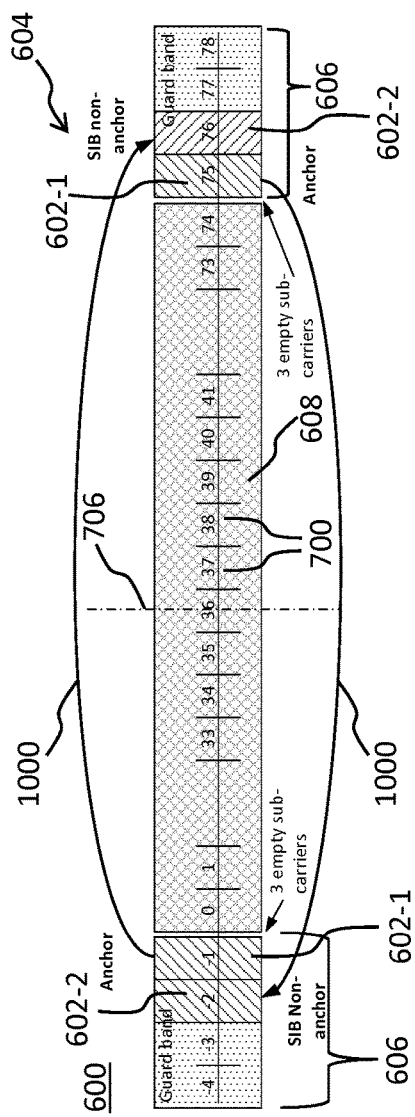
Figure 12C:
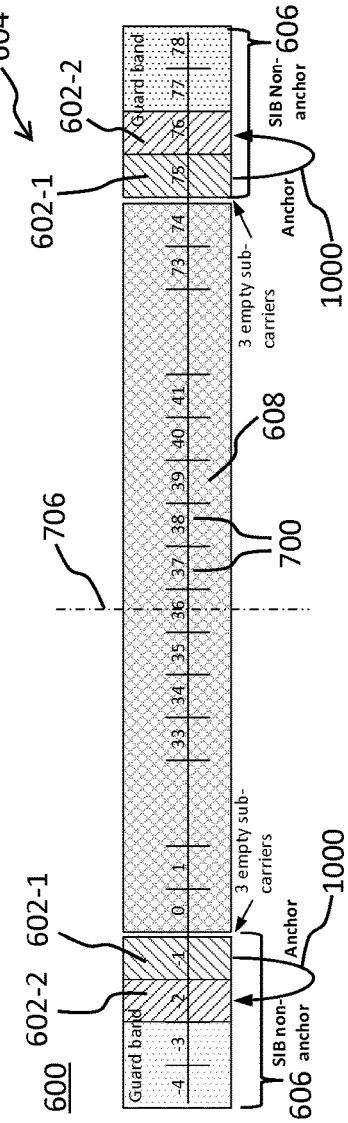

FIG. 12A to 12C schematically illustrates examples of the NB-IoT TDD guard-band deployment, which may be implemented using any embodiment described herein. Without limitation, the LTE channel bandwidth 609 spans 15 MHz. The LTE system bandwidth 608 comprises 75 PRBs 700.

In the example of FIG. 12A, the MIB-NB is transmitted in the step 302 on a single anchor carrier 602-1 and indicative of the SIB1-NB non-anchor carrier 602-2, i.e., the spectral resource, which is allocated at the opposite end of the MBB 604. The relative position of the NB carriers 602-1 and 602-2 is also referred to as a "mirror deployment".

In the example of FIG. 12B, the MIB-NB is transmitted according to the step 302 on each of two anchor carriers 602-1. Each MIB-NB is indicative of the SIB1-NB non-anchor carrier 602-2 (as the spectral resource for the SIB) that is allocated at the opposite end of the MBB 604 relative to the anchor carrier 602-1. This position of the NB carriers 602-1 and 602-2 relative to the center DC subcarrier 706 is also referred to as a "mirror deployment".

In the example of FIG. 10C, the MIB-NB is transmitted according to the step 302 on each of two anchor carriers 602-1. Each MIB-NB is indicative of the SIB1-NB non-anchor carrier 602-2 (as the spectral resource for the SIB) that is allocated at the same side of the MBB 604 at which the anchor carrier 602-1 is located. This position of the NB carriers 602-1 and 602-2 relative to each other "back-to-back deployment" (B2B).

Figure 13:
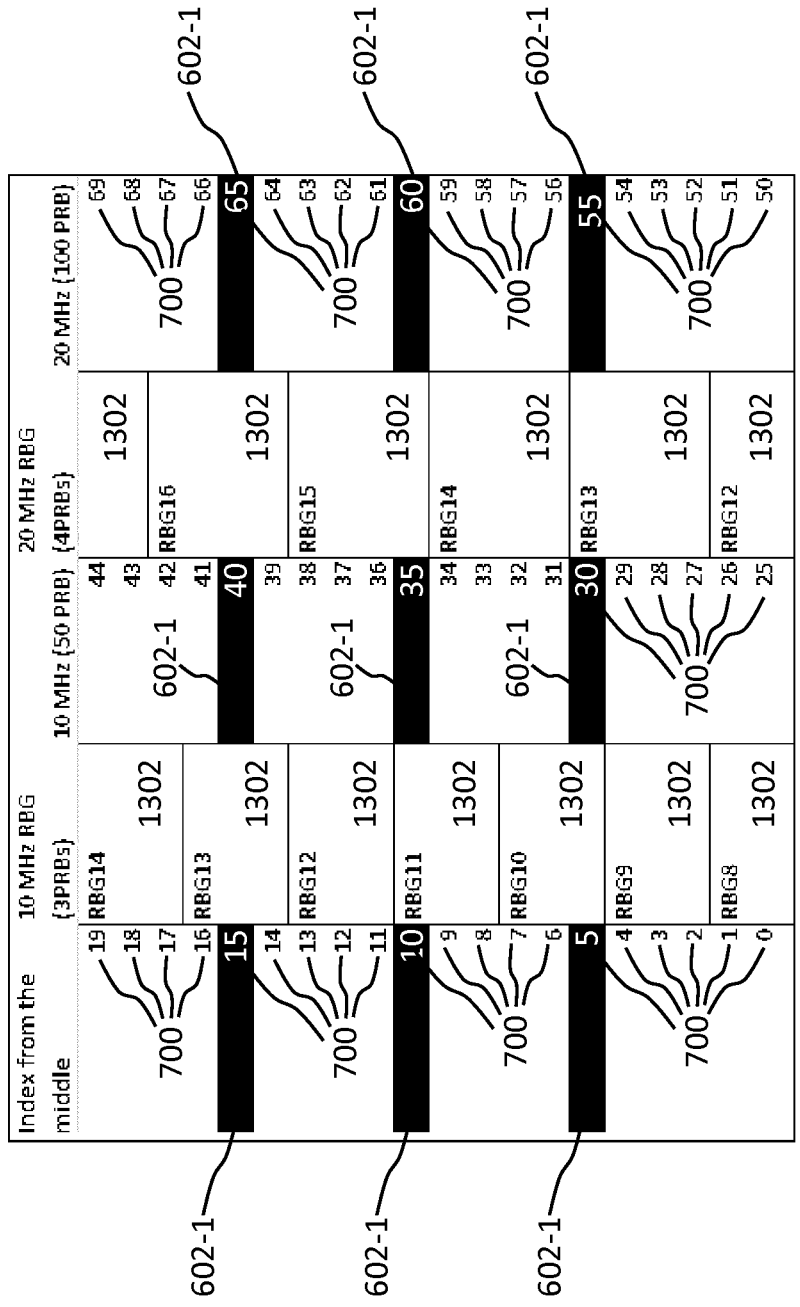
FIG. 13 schematically illustrates a grouping of radio blocks.

FIG. 13 schematically illustrates an exemplary grouping 1300 of PRBs 700 into PRB groups (RBGs) 1302 for different MBB channel bandwidths 609. The PRBs 700 are represented by an index from the middle of the MBB channel bandwidths 609.

Example positions of the anchor carrier 602-1 for the NB communication 502 in an RBG are shown in FIG. 13 in units of the PRBs 700. A corresponding index may be included for the indication 1000 of the spectral resources (being either the anchor carrier 602-1 or another non-anchor carrier 602-2) in the MIB-NB. Furthermore, the NB carriers 602-1 and/or 602-2 may be arranged symmetrically with respect to the center DC subcarrier 706, i.e., using the same position in terms of the index from the middle.

The same position of the anchor carrier in terms of the PRB-index from the middle of the of the MBB channel bandwidths 609 may be at different sides of the RBG 1302 for different MBB channel bandwidths 809, as is evident from the example with index 10.

A first embodiment of the technique is described, partly with reference to FIGS. 10 to 13 to explain implementation variants of the embodiment. The MIB-NB for NB-IoT TDD communication 502 is indicative to the UEs 512 whether SIB1-NB is on the anchor carrier 602-1 or a non-anchor carrier 602-2. This indication 1000 is also referred to as SIB Mode (e.g., SIB1-NB Mode).

One bit from the spare bits in the MIB-NB (e.g., as outlined above as a starting point for implementing the MIB-NB according to the technique) can be used to indicate the SIB1-NB Mode. An exemplary definition of the SIB1-NB Mode may be consistent with the values for the indication 1000: "0" means that the SIB1-NB is transmitted on the anchor carrier 602-1 as the spectral resource. "1" means that the SIB1-NB is transmitted in the step 304 on a non-anchor carrier 602-2 as the spectral resource.

An exemplary format and corresponding signal structure for the MIB-NB in the NB-IoT TDD communication 502 is shown in the ASN.1 below. In this implementation variant of the first embodiment, an anchor parameter called "sib1-NB-mode-tdd" is included in the MIB-NB as the indication 1000 or as part of the indication 1000. For example, the indication 1000 may comprise the anchor parameter and an extension of the existing information element (IE) Operation Info Mode. Due to the latter IE, the spare bits left in MIB-NB will be fewer, e.g., 9 spare bits.

A portion of an exemplary MIB-NB according to the first embodiment is outlined below.

15 MHz and 20 MHz as the LTE channel bandwidths 809. NB-IoT guard-band deployment is (e.g., only) possible for 5 MHz, 10 MHz, 15 MHz and 20 MHz channel bandwidth 809. In the guard-band mode, NB-IoT carriers 602-1 and 602-2 are placed in the guard-band area 606 of a LTE channel band 809.

It is possible but not necessary that the NB-IoT carriers 602-1 and 602-2 are placed on the LTE PRB grid. Moreover, the NB-IoT carriers 602-1 and 602-2 are preferably placed on the LTE subcarrier grid to avoid inter-subcarrier interference. In principle, NB-IoT carriers 602-1 and 602-2 can be placed on any subcarriers in the guard-band, as long as the 180 kHz NB-IoT band falls entirely into the guard-band 606.

Furthermore, for the anchor carrier 602-1, the frequency offset to the 100 kHz channel raster must be +/−2.5 kHz or +/−7.5 kHz, otherwise NB UE 512 might be unable to find the anchor carrier 602-1.

Since NB-IoT carriers 602-1 and 602-2 in the guard-band 606 can be deployed on so many different positions, it is difficult or impossible to be signaled with just a few bits. Therefore, it is proposed to define a limited number of candidate positions for NB-IoT deployment. Advantageous implementation of selecting these candidate positions in the guard-band mode are discussed.

General speaking, it is beneficial to deploy NB-IoT as close as possible to the LTE carrier, i.e., to the LTE system bandwidth 608, to reduce adjacent channel interference and to simplify implementation for network equipment (e.g., the base station 510), etc. For LTE channel bandwidths of 20 MHz and 10 MHz, the first PRBs 700 in the guard-band happen to be sufficiently close to the 100 kHz channel raster 1100 (i.e., with an offset being less than 7.5 kHz, actually being 2.5 kHz). Hence, the first PRB 700 in the guard-band 606 can be chosen as the anchor carrier 602-1. Each of FIGS. 10A to 10C schematically illustrates an exemplary

```
MasterInformationBlock-NB ::=      SEQUENCE {
    systemFrameNumber-MSB-r13          BIT STRING (SIZE (4)),
    hyperSFN-LSB-r13                   BIT STRING (SIZE (2)),
    schedulingInfoSIB1-r13             INTEGER (0..15),
    systemInfoValueTag-r13             INTEGER (0..31),
    ab-Enabled-r13                     BOOLEAN,
    sib1-NB-mode-tdd                   ENUMERATED{anchor, non-anchor},
    operationModeInfo-r13              CHOICE {
        inband-SamePCI-r13                 Inband-SamePCI-NB-r13,
        inband-DifferentPCI-r13            Inband-DifferentPCI-NB-r13,
        guardband-r13                      Guardband-NB-r13,
        standalone-r13                     Standalone-NB-r13
    },
    spare                              BIT STRING (SIZE (11 N))
}
```

Furthermore, IE Operation Mode Info in the MIB-NB provides operation mode specific information to the NB UEs 512. This IE may be extended to transmit in the step 302 a SIB1-NB configuration that depends on the operation mode. The skilled person can notice in the above ASN.1 for the MIB-NB that there are a few spare bits in the IE Operation Mode Information for some of the operation modes, e.g., for the guard-band operation mode, the in-band operation mode (more specifically the in-band-operation mode wherein the same physical cell identifier, PCI, is used for both NB 602 and MBB 604) and the standalone mode. These spare bits can be used for the SIB1-NB configuration.

The guard-band mode is described for the first embodiment. 3GPP LTE defines 1.4 MHz, 3 MHz, 5 MHz, 10 MHz, NB-IoT TDD deployment in the guard-band 606 of an LTE band 604 with 20 MHz channel bandwidth 609.

For channel bandwidths 609 being 15 MHz or 5 MHz, the first PRBs in the guards-band are so much off the channel raster that they cannot be used as anchor carriers. The first possible anchor-carrier PRBs 700 in the guard-band 600 is the third one, counting from the edge of the LTE in-band 608. To reduce the frequency gap from the LTE system band 608, three empty subcarriers are added or introduced (e.g., left unallocated) next to the in-band edge, so as to push the first PRB 700 in the guard-band 606 to the channel raster 1100. After the insertion of the 3 empty subcarriers, the shifted first PRB 700 in the guard-band 600 is 7.5 kHz off to the NB carrier raster 1100. Hence, the shifted first PRB 700 may be used as the anchor carrier 602-1 for the NB-IoT 602. FIG. 11 schematically illustrates an exemplary NB-IoT TDD deployment in the guard-band 600 of an LTE band 604 with 15 MHz channel bandwidth 609.

Based on the above analysis, for the guard-band deployment of the NB-IoT TDD communication 502, the one or two anchor carriers 602-1 can be placed on the first PRB in the guard-band 606, counting from the edge of the in-band. For 15 MHz and 5 MHz cases of the channel bandwidth 609, 3 empty subcarriers may be added in-between a PRB grid in the in-band 608 (for PRBs 700 available to the MBB 604) and a PRB grid in the guard-band 606 (for PRBs 700 available to the NB 602).

width may be indicative of LTE bandwidth 608 in number of PRBs. A second parameter SIB1-NB Position may indicate on which side of the anchor carrier 602-1 the SIB1-NB carrier 602-2 is deployed in the frequency spectrum, e.g., being either "lower frequency" or "higher frequency". A third parameter SIB1-NB PRB Info may indicate on which guard-band PRB 700 the SIB1-NB non-anchor carrier 602-2 is mapped, being either "first" or "second" PRB.

Below ASN.1 shows an exemplary realization of guard-band Operation Mode Info as a portion of an exemplary MIB-NB according to the first embodiment.

```
Guardband-NB-r13 ::=            SEQUENCE {
    rasterOffset-r13                ChannelRasterOffset-NB-r13,
    inband-bandwidth-tdd            ENUMERATED{n25, n50, n75, n100},
    sib1-NB-position-tdd            ENUMERATED{lower-freq, higher-freq},
    sib1-NB-prbInfo-tdd             ENUMERATED{first-prb, second-prb},
    spare                           BIT STRING (SIZE (N))
}
```

Following the same SIB1-NB non-anchor carrier deployment principle, FIGS. 12A to 12C schematically illustrate different examples the guard-band deployment of the NB-IoT TDD communication 502 coexisting with an LTE band 602 comprising a channel bandwidth 609 of 15 MHz.

The SIB1-NB non-anchor carrier can be deployed in the second guard-band PRB 700 adjacent to the anchor carrier 602-1 (e.g., as illustrated in each of FIGS. 12B and 12C) or on the other side of the LTE band 604 (e.g., as illustrated in FIG. 12A). Herein, the case of an indication 1000 in the MIB referring to a non-anchor carrier 602-2 as the spectral resource is referred to as "back-to-back" deployment (e.g., as illustrated in FIG. 12C). The case of an indication 1000

In another implementation, the SIB1-NB Position and SIB1-NB PRB Info are jointly encoded into a 2-bit field with the following exemplary definition (referred as SIB1-NB Configuration Guard-band herein).

SIB1-NB Configuration Guard-band:
00: Back-to-back deployment, second PRB
01: Mirror deployment, first PRB
10: Mirror deployment, second PRB
11: reserved An exemplary realization of guard-band Operation Mode Information with SIB1-NB configuration as a portion of an exemplary MIB-NB according to the first embodiment is outlined below.

```
Guardband-NB-r13 ::=            SEQUENCE {
    rasterOffset-r13                ChannelRasterOffset-NB-r13,
    inband-bandwidth-tdd            ENUMERATED {n25, n50, n75, n100},
    sib1-NB-configGuardband-tdd     ENUMERATED {b2b-second-prb, mirror-first-prb, mirror-
                                    second-prb},
    spare                           BIT STRING (SIZE (N))
}
``` referring to the other side of the LTE band 604 is referred as "mirror deployment" (e.g., as illustrated in FIGS. 12A and 12B). In the mirror deployment scenario, the non-anchor carrier 602-2 for the SIB1-NB may be deployed in the first guard-band PRB 700, which is preferable from network implementation complexity perspective (e.g., as illustrated in FIG. 12A), or on the second guard-band PRB 700, leaving the first guard-band PRB for another anchor carrier deployment (e.g., as illustrated in FIG. 12C).

For the UE 512 to be able to locate the SIB1-NB non-anchor carrier 602-2 which may be locate on the other end of the LTE band 604, the in-band bandwidth 608 in numbers of PRBs 700 is included in the Operation Mode Information for the guard-band mode. The enumerated numbers of in-band bandwidths 608 should include 25, 50, 75 and 100 in terms of PRBs 700, corresponding to 5, 10, 15 and 20 MHz LTE bandwidth 609, respectively.

There are different alternative implementations to provide SIB1-NB non-anchor carrier configuration in MIB-NB. One implementation is to extend the existing guard-band IE Operation Mode Information with any combination of the three following parameters. A first parameter In-band-band- As can be seen in the subsequent sections, the SIB1-NB Position parameter may also be used in broadcasting SIB1-NB configuration for in-band and standalone modes. Furthermore, the SIB1-NB Position may be lifted (e.g., implemented as a global parameter included in the IE for the MIB-NB) to become a common parameter for all operation modes. Alternatively or in addition, this information can be jointly encoded with some other parameters in the MIB-NB, for which an exemplary realization is given in the subsequent section.

With the anchor carrier deployment mechanism described above, the NB UE 512 can identify on which side of the LTE band 604 the anchor carrier 602-1 is located, by looking at the Channel Raster Offset and In-band Bandwidth in the Operation Mode Information, according the table below. A positive channel raster offset indicates an anchor carrier in the lower frequency guard-band while a negative value indicates an anchor carrier in the higher frequency guard-band. Together with the signaled in-band bandwidth 608 and the SIB1-NB configuration parameters, the NB UE 512 can determine the exact location of the SIB1-NB non-anchor carrier 602-2.

Below table outlines an exemplary relation between the sign of a channel raster offset and a guard-band location for anchor carriers in the guard-band deployment.

| In-band bandwidth | Channel raster offset for anchor carriers | |
|---|---|---|
| 608 (number of PRBs) | Guard-band in lower frequency | Guard-band in higher frequency |
| 25 | 7.5 kHz | −7.5 kHz |
| 50 | 2.5 KHz | −2.5 KHz |
| 75 | 7.5 kHz | −7.5 kHz |
| 100 | 2.5 KHz | −2.5 KHz |

An in-band deployment of the first embodiment is described. NB-IoT TDD carriers 602-1 and 602-2 are deployed on the LTE PRB grid 608 to coexist with the LTE-TDD system. NB-IoT TDD anchor carriers 602-1 can be deployed on the LTE PRBs 700 whose central frequencies 802 are no more than 7.5 kHz offset to the 100 kHz channel raster 1100. Theoretically, SIB1-NB non-anchor carrier 602-2 can be deployed in any other LTE PRBs 700, except for central ones (e.g., the mid 6 PRBs 804) in which LTE PSS/SSS/PBCH are broadcasted. Following the 3GPP Release 14 frequency structure, to uniquely indicate a non-anchor PRB for SIB1-NB with full deployment flexibility requires 5 bits. If certain constraints can be put on the non-anchor carrier deployment, for example, by limiting SIB1-NB non-anchor carrier to the adjacent PRBs around the anchor carrier, fewer bits can be used.

As discussed before, for the in-band operation, it is desirable to have the anchor carrier and non-anchor carrier in the same PRB group (RBG) 1302. Therefore, it is preferable to configure, by means of the MIB-NB, the position of the non-anchor carrier 602-2 as the closest PRB 700 either to the lower or higher frequency of the anchor carrier 602-1. This is because the anchor carrier can be at the either side of the boundaries of the RBG group, as shown in FIG. 13.

Hence, another 1 bit in the MIB-NB may be indicative of whether the non-anchor carrier 602-2 is the closest PRB 700 either to the lower or higher frequency of the anchor carrier 602-1. In below example, a parameter SIB1-NB Position is defined as part of the indication 1000 in the MIB-NB.

```
Inband-SamePCI-NB-r13 ::=          SEQUENCE {
    eutra-CRS-SequenceInfo-r13         INTEGER (0..31)
    sib1-NB-position-tdd               ENUMERATED {lower_freq, higher_freq},
}
Inband-DifferentPCI-NB-r13 ::=     SEQUENCE {
    eutra-NumCRS-Ports-r13             ENUMERATED {same, four},
    rasterOffset-r13                   ChannelRasterOffset-NB-r13,
    sib1-NB-position-tdd               ENUMERATED {lower_freq, higher_freq},
    spare                              BIT STRING (SIZE (2 N))
}
```

In a variant, as mentioned above in the context of the guard-band deployment, the SIB1-NB Position parameter may be lifted as a common parameter for all operation modes. A corresponding example is outlined in below portion of an exemplary MIB-NB.

```
MasterInformationBlock-NB ::=      SEQUENCE {
    systemFrameNumber-MSB-r13          BIT STRING (SIZE (4)),
    hyperSFN-LSB-r13                   BIT STRING (SIZE (2)),
    schedulingInfoSIB1-r13             INTEGER (0..15),
    systemInfoValueTag-r13             INTEGER (0..31) ,
    ab-Enabled-r13                     BOOLEAN,
    sib1-NB-mode-tdd                   ENUMERATED{anchor, non-anchor},
    sib1-NB-position-tdd               ENUMERATED{lower_freq, higher_freq},
    operationModeInfo-r13              CHOICE {
        inband-SamePCI-r13                 Inband-SamePCI-NB-r13,
        inband-DifferentPCI-r13            Inband-DifferentPCI-NB-r13,
        guardband-r13                      Guardband-NB-r13,
        standalone-r13                     Standalone-NB-r13
    },
    spare                              BIT STRING (SIZE (11 N))
}
```

In a variant of the embodiment, the higher-frequency PRB 700 or the lower-frequency PRB 700 as the spectral resource for the SIB is not implemented as a binary indicator. Rather, the indication in the MIB-NB may comprise a step size in numbers of PRBs 700 and the direction being always to a higher (or lower) PRB with a wrap-around at the boundary of the RBG 1302.

A standalone deployment of the embodiment is described. In this deployment case, there is no coexisting MBB (e.g., LTE-TDD) system. The NB-IoT TDD anchor carrier 602-1 may be deployed on the 100 kHz channel raster 1100 in the assigned frequency band of the NB TDD communication 502.

In 3GPP Release 13, non-anchor carriers may be deployed on the 100 kHz channel raster in the same frequency band as the anchor carrier, which is basically the deployment principle for NB-IoT FDD.

However, if two NB-IoT carriers 602-1 and/or 602-2 are deployed in two adjacent 200 kHz channels, the adjacent channel interference might become a problem. Due to that, the NB-IoT channels cannot be fit into the same 15 kHz subcarrier grid. A comprehensive analysis on this problem can be found in the 3GPP document R4-1703804 ["Channel Raster For Multiple Standalone NB-IoT Carriers, source Nokia", Alcatel-Lucent Shanghai Bell, 3GPP TSG-RAN4#82-Bis, Spokane, Washington, USA, 3-7 Apr. 2017].

Preferably, the non-anchor carriers 602-2 are not exactly placed on the 100 kHz channel raster 1100. Instead, they are deployed with a certain frequency offset to the channel raster 1100, to achieve a sub-carrier grid alignment with the anchor carrier 602-1.

Whichever deployment principle is adopted, SIB1-NB non-anchor carriers 602-2 may be indicated in the MIB-NB with a relative frequency offset to the anchor carrier 602-1. The relative frequency offset may be given in number of 15 kHz subcarriers, or in number of 180 kHz PRBs, or in number of 200 kHz NB-IoT channel bandwidth.

In the existing MIB-NB (e.g., for FDD), there are 5 spare bits that can be used for this purpose. Furthermore, potential additional bits for the extension of the Operation Mode Information (e.g., for the in-band mode as described in the previous section) can also be used. An exemplary ASN.1 for the Operation Mode Information is may be defined as follows.

```
Standalone-NB-r13 ::=          SEQUENCE {
    sib1-NB-position-tdd          ENUMERATED {lower_freq, higher_freq},
    sib1-NB-offsetStandalone-tdd  INTEGER(1..16)
    spare                         BIT STRING (SIZE (N))
}
```

In the above example, 1 bit is used as the SIB1-NB Position with the same definition as for the other deployment modes and 4 bits are used to indicate the absolute value of the SIB1-NB carrier frequency offset in terms of PRBs relative to the anchor carrier 602-1.

MIB-NB ASN.1 for Exemplary Realization of the First Embodiment

While different deployments have been described separately and may be implemented separately, a preferred implementation of the first embodiment uses a format or signal structure for the MIB that is capable of being deployed in two or all three operation modes.

Summarizing the analysis given above, a MIB-NS ASN.1 for an exemplary realization of the first embodiment to address the problem of indicating the spectral resource (e.g., the SIB1-NB non-anchor 602-2) for the NB-IoT TDD communication 502 is outlined below. The text marked in bold is what may be added or updated, taking the afore-cited definition for 3GPP Release 14 as the starting point or as a baseline.

```
-- ASN1START
MasterInformationBlock-NB ::=      SEQUENCE {
    systemFrameNumber-MSB-r13         BIT STRING (SIZE (4)),
    hyperSFN-LSB-r13                  BIT STRING (SIZE (2)),
    schedulingInfoSIB1-r13            INTEGER (0..15),
    systemInfoValueTag-r13            INTEGER (0..31),
    ab-Enabled-r13                    BOOLEAN,
    sib1-NB-mode-tdd                  ENUMERATED {anchor, non-anchor},
    operationModeInfo-r13             CHOICE {
        inband-SamePCI-r13                Inband-SamePCI-NB-r13
        inband-DifferentPCI-r13           Inband-DifferentPCI-NB-r13,
        guardband-r13                     Guardband-NB-r13,
        standalone-r13                    Standalone-NB-r13
    },
    spare                             BIT STRING (SIZE (9))
}
ChannelRasterOffset-NB-r13 ::= ENUMERATED {khz-7dot5, khz-2dot5, khz2dot5, khz7dot5}
Guardband-NB-r13 ::=              SEQUENCE {
    rasterOffset-r13                  ChannelRasterOffset-NB-r13,
```

```
    inband-bandwidth-tdd              ENUMERATED{n25, n50, n75, n100},
    sib1-NB-position-tdd              ENUMERATED{lower_freq, higher_freq},
    sib1-NB-prbInfo-tdd               ENUMERATED{first-prb, second-prb},
}
Inband-SamePCI-NB-r13 :: =            SEQUENCE {
    eutra-CRS-SequenceInfo-r13        INTEGER (0..31)
    sib1-NB-position-tdd              ENUMERATED {lower_freq, higher_freq},
}
Inband-DifferentPCI-NB-r13 ::=        SEQUENCE {
    eutra-NumCRS-Ports-r13            ENUMERATED {same, four},
    rasterOffset-r13                  ChannelRasterOffset-NB-r13,
    sib1-NB-position-tdd              ENUMERATED{lower_freq, higher_freq},
    spare                             BIT STRING (SIZE (2))
}
Standalone-NB-r13 ::=                 SEQUENCE {
    sib1-NB-position-tdd              ENUMERATED {lower_freq, higher_freq},
    sib1-NB-offsetStandalone-tdd      INTEGER(1..16)
    spare                             BIT STRING (SIZE (1))
}
-- ASN1STOP
```

In the above example, the total size of MIB-NB remains 34 bits, i.e., the same size as MIB-NB for NB-IoT FDD. The Operation Mode Information for guard-band is extended with the parameters In-band Bandwidth, SIB1-NB Position and SIB1-NB PRB Information. Alternatively or in combination, the Operation Mode Information for in-band-same-PCI and in-band-different-PCI modes are extended with the parameter SIB1-NB Position. Alternatively or in combination, the Operation Mode Information for the standalone case is extended with a 5-bit parameter specifying SIB1-NB non-anchor carrier offset to the anchor carrier in number of 180 kHz PRB bandwidth, which gives a non-anchor carrier deployment dynamic of 5.76 MHz.

In total 2 extra bits are used in the above example compared to the base-line, resulting 9 spare bits left in MIB-NB for future usage.

A second embodiment of the technique is described, which may be combined with the first embodiment. In the second embodiment the indication 1000 in the MIB jointly encodes the SIB1-NB position together with the previously defined SIB1-NB mode in a 2-bit field. The example is outlined as below portion of an exemplary MIB-NB.

```
MasterInformationBlock-NB ::=    SEQUENCE {
    systemFrameNumber-MSB-r13    BIT STRING (SIZE (4)),
    hyperSFN-LSB-r13             BIT STRING (SIZE (2)),
    schedulingInfoSIB1-r13       INTEGER (0..15),
    systemInfoValueTag-r13       INTEGER (0..31),
    ab-Enabled-r13               BOOLEAN,
    sib1-NB-mode-tdd             ENUMERATED{anchor, non-anchor_lower_freq, non-
                                             anchor_higher_freq},
    operationModeInfo-r13        CHOICE {
        inband-SamePCI-r13           Inband-SamePCI-NB-r13,
        inbandDifferentPCI-r13       Inband-DifferentPCI-NB-r13,
        guardband-r13                Guardband-NB-r13,
        standalone-r13               Standalone-NB-r13
    },
    spare                        BIT STRING (SIZE (1 N))
}
```

Notice that in above example, only 3 different values need to be signaled. Two bits gives 4 different values. Therefore, for further compatibility, e.g., in 3GPP Release 15, the fourth value of the 2-bit-paramezer may be interpreted as being the same as the first value. For example, bits "00" may be used to indicate SIB1-NB is transmitted on only the anchor carrier, "01" to indicate SIB1-NB is transmitted non-anchor carrier 602-2 which is the nearest PRB to the lower-frequency of the anchor carrier 602-1, and "10" to indicate that the SIB1-NB is transmitted the non-anchor carrier 602-2 which is the nearest PRB to the higher-frequency of the anchor carrier 602-1. The bits "11" may have the same meaning as either "00", "01" or "10".

Below portion of another exemplary MIB-NB uses 4 different values.

alone-tdd, according to the first embodiment without having the sign (+ or −) of the offset (given by SIB1-NB-Position field in Operation Mode Info for in-band mode). This is because the +/− sign of the offset is indicated already by the 2-bit filed.

When it comes to the guard-band, the field sib1-NB-mode-tdd may be used to replace the SIB1-NB-Position field in the Operation Mode Information for guard-band mode according to the first embodiment. This is because the field sib1-NB-mode-tdd may indicate whether the non-anchor carrier 602-2 is at the neighbor (i.e., back-to-back) of the anchor carrier 602-1 or on the other band edge (i.e., mirrored). Noteworthy, it is only possible to have one anchor carrier 602-1 in the guard-band at each side or edge of the MBB band 604, and the channel raster 1100 of the anchor

```
MasterInformationBlock-NB ::=      SEQUENCE {
    systemFrameNumber-MSB-r13         BIT STRING (SIZE (4)),
    hyperSFN-LSB-r13                  BIT STRING (SIZE (2)),
    schedulingInfoSIB1-r13            INTEGER (0..15),
    systemInfoValueTag-r13            INTEGER (0..31),
    ab-Enabled-r13                    BOOLEAN,
    sib1-NB-mode-tdd                  ENUMERATED{anchor subframe0, anchor_subframe4, non-
                                          anchor_lower_freq, non-anchor_higher_freq},
    operationModeInfo-r13             CHOICE {
        inband-SamePCI-r13                Inband-SamePCI-NB-r13,
        inband-DifferentPCI-r13           Inband-DifferentPCI-NB-r13,
        guardband-r13                     Guardband-NB-r13,
        standalone-r13                    Standalone-NB-r13
    },
    spare                             BIT STRING (SIZE (H̶ N))
}
```

In the above example, the MIB is indicative of the subframe that is used for the SIB1-NB transmission on the anchor carrier, which can be beneficial from the interference management point of view. While above subframe #0 and subframe #4 are used here as examples, other downlink subframes may also be used and configured in the MIB.

Moreover, this field sib1-NB-mode-tdd may be interpreted differently for different operation modes. For the in-band case, the straightforward interpretation is whether the non-anchor carrier 602-2 is used for SIB1-NB transmission, and if it is used, whether the non-anchor carrier 602-1 is the nearest PRB to the lower or higher frequency side of the anchor carrier 602-1.

When in standalone mode, the interpretation can be whether the non-anchor carrier 602-2 is used for SIB1-NB transmission, and if it is used, whether the non-anchor carrier 602-2 is to the lower or higher frequency side of the anchor carrier 602-1. The exact position of the non-anchor carrier may be signaled by using, e.g., sib1-NB-offsetStandcarrier 602-1 may be used by the NB UE 512 to identify at which side of the band edge the anchor carrier 602-1 resides. In some of the bandwidths 608, the anchor carrier 602-1 is not on the PRB grid. However, the NB UE 512 may use the anchor carrier 602-1 as a reference to determine the position of the non-anchor carrier 602-1 that carries the SIB1-NB.

For example, in the guard-band mode, the 2-bit field sib-NB-mode-tdd indicates whether the SIB1-NB is transmitted on the non-anchor carrier 602-2, and if so, together with the channel raster 1100 of the anchor carrier 602-1, it may be indicative of whether the non-anchor carrier 602-2 is at the same band edge, or at the other (e.g., opposite) band edge. The PRB position and MBB bandwidth 608 of the LTE system may be signaled in the same way as in first embodiment.

A portion of another exemplary realization of the MIB-NB is outlined below by means of ASN.1.

```
-- ASN1START
MasterInformationBlock-NB ::=      SEQUENCE {
    systemFrameNumber-MSB-r13         BIT STRING (SIZE (4)),
    hyperSFN-LSB-r13                  BIT STRING (SIZE (2)),
    schedulingInfoSIB1-r13            INTEGER (0..15),
    systemInfoValueTag-r13            INTEGER (0..31),
    ab-Enabled-r13                    BOOLEAN,
    sib1-NB-mode-tdd                  ENUMERATED{anchor, non-anchor_lower_freq,
                                          anchor_higher_freq},
    operationModeInfo-r13             CHOICE {
        inband-SamePCI-r13                Inband-SamePCI-NB-r13,
        inband-DifferentPCI-r13           Inband-DifferentPCI-NB-r13,
        guardband-r13                     Guardband-NB-r13,
        standalone-r13                    Standalone-NB-r13
    },
    spare                             BIT STRING (SIZE (9))
```

```
}
ChannelRasterOffset-NB-r13 ::= ENUMERATED {khz-7dot5, khz-2dot5, khz2dot5, khz7dot5}
Guardband-NB-r13 ::=           SEQUENCE {
    rasterOffset-r13               ChannelRasterOffset-NB-r13,
    inband-bandwidth-tdd           ENUMERATED {n25, n50, n75, n100},
    sib1-NB-prbInfo-tdd            ENUMERATED{first-prb, second-prb},
}
Inband-SamePCI-NB-r13          SEQUENCE {
    eutra-CRS-SequenceInfo-r13     INTEGER (0..31)
}
Inband-DifferentPCI-NB-r13 ::= SEQUENCE {
    eutra-NumCRS-Ports-r13         ENUMERATED {same, four},
    rasterOffset-r13               ChannelRasterOffset-NB-r13,
    spare                          BIT STRING (SIZE (2))
}
Standalone-NB-r13 ::=          SEQUENCE {
    sib1-NB-offsetStandalone-tdd   INTEGER(1..16)
    spare                          BIT STRING(SIZE (1))
}
-- ASN1STOP
```

In the above example, the SIB1-NB Position is treated as a common parameter for all operation modes and jointly encoded into the SIB1-NB Mode. Same as the first example, two extra bits are used in the above example compared to the MIB-NB for NB-IoT FDD in Release 14.

Figures 14A, 14B:
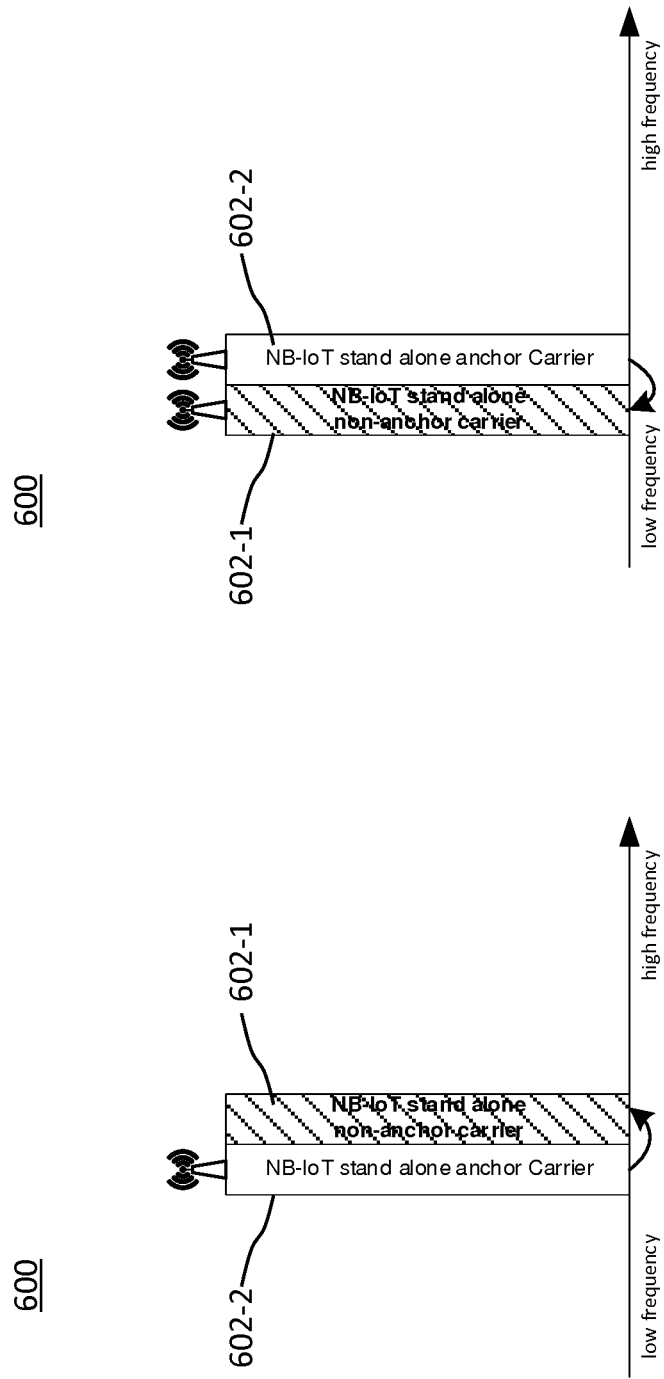
FIGS. 14A and 14B schematically illustrates a fifth example of a frequency band.

Any standalone deployment may determine the spectral resource for SIB, i.e., the non-anchor carrier 602-1 based on the field sib-NB-mode-tdd. FIGS. 14A and 14B schematically illustrate the case of the third value and the second value, respectively, of this field being signaled by the MIB in the step 302. For example, the SIB1 non-anchor 602-2 may be indicated by setting the parameter higher_freq or lower_freq in the first embodiment, or by setting the parameter non-anchor_higher_freq or non-anchor_lower_freq in the second embodiment.

In a third embodiment, which may be combined with the first or second embodiments, a limited set of possible PRBs 700 (i.e., candidates) for SIB1-NB is defined (e.g., one set for each of the in-band deployment, the guard-band deployment, and the standalone deployment). The indication 1000

| MIB-indication 1000 | Meaning of the value |
|---|---|
| 00 | SIB1-NB on anchor carrier |
| 01 | SIB1-NB on PRB candidate 1 |
| 10 | SIB1-NB on PRB candidate 2 |
| 11 | SIB1-NB on PRB candidate 3 |

In a fourth embodiment, which may be combined with any embodiment or implementation described herein, the SIB1-NB non-anchor carrier may be pre-defined with reference to the anchor carrier. For example, the location of the SIB1-NB non-anchor 602-2 may be fixed (e.g., predefined or hard-coded) to be at the adjacent higher-frequency side of the anchor carrier 602-1. One bit in the MIB is indicative of the presence of SIB1-NB on the non-anchor carrier 602-2. Once the UE 512 receives this notification, it detects the SIB1-NB non-anchor carrier 602-2 at the adjacent higher-frequency side.

A portion of a corresponding exemplary MIB-NB is outlined below by means of ASN.1 below

```
MasterInformationBlock-NB ::=     SEQUENCE {
    systemFrameNumber-MSB-r13         BIT STRING (SIZE (4)),
    hyperSFN-LSB-r13                  BIT STRING (SIZE (2)),
    schedulingInfoSIB1-r13            INTEGER (0..15),
    systemInfoValueTag-r13            INTEGER (0..31),
    ab-Enabled-r13                    BOOLEAN,
    sib1-NB-non-anchor-tdd            ENUMERATED {true},
    operationModeInfo-r13             CHOICE {
        inband-SamePCI-r13                Inband-SamePCI-NB-r13,
        inband-DifferentPCI-r13           Inband-DifferentPCI-NB-r13,
        guardband-r13                     Guardband-NB-r13,
        standalone-r13                    Standalone-NB-r13
    },
    spare                             BIT STRING (SIZE (10))
}
``` in the MIB-NB may only point out which one of the possible PRB candidates is currently used.

By way of example, for the guard-band operation, there may be 3 possible PRBs 700 for the non-anchor carrier 602-2 for the transmission of SIB1-NB in the same guard-band 606, such that knowing the LTE bandwidth is not necessary, and the indication 1000 in the MIB-NB may only point out which one of following applies:

The fourth embodiment uses the minimum number of bits to signal the indication 1000 of whether SIB1-NB is transmitted on the non-anchor carrier 602-2 or not. Then it is up to the eNB implementation to ensure a proper deployment to minimize the fragmentation of the RBG.

Any of the aforementioned embodiments and implementations may be extended embodiment for system information other than SIB1-NB. Each of the above-described 4 embodiments may enable the selective signaling of SIB1-NB on the non-anchor carrier 602-2. The same principle may be extended to the signaling of other system information (SI). For example, SI-messages containing all other SIBs may be scheduled on non-anchor carriers.

The MIB-NB is transmitted on the same NB-IoT anchor carrier 602-1 that is also used for NPSS and/or NSSS. A single NB-IoT non-anchor carrier (i.e., other than the anchor carrier 602-1) is used for any SIBs other than SIB1-NB. The single NB-IoT non-anchor carrier for SIBx, x being an integer greater than 1, is in a PRB 700 indicated by the SIB1-NB. Optionally, in a radio layer 2 (RAN2) implementation, the signalling may be omitted in case the SIBx are on the anchor carrier 602-1.

In an optional extension of any embodiment, the methods of pointing out the non-anchor 602-2 in which SIB1-NB is transmitted is reused also for pointing out the non-anchor carrier in which the SI-messages (i.e., the other SIBs "SIBx") are transmitted. The SI-messages are scheduled (i.e., indicated) by the SIB1-NB transmitted in the step 304. A corresponding example for the SIB1-NB is illustrated below by means of ASN.1. Any subset of the features in bold type may be implemented (e.g., independent of the context not printed in bold type).

```
-- ASN1START
SystemInformationBlockType1-NB ::=         SEQUENCE {
        hyperSFN-MSB-r13                       BIT STRING (SIZE (8)),
        cellAccessRelatedInfo-r13              SEQUENCE {
            plmn-IdentityList-r13                  PLMN-IdentityList-NB-r13,
            trackingAreaCode-r13                   TrackingAreaCode,
            cellIdentity-r13                       CellIdentity,
            cellBarred-r13                         ENUMERATED {barred, notBarred},
            intraFreqReselection-r13               ENUMERATED {allowed, notAllowed}
        },
        cellSelectionInfo-r13                  SEQUENCE {
            q-RxLevMin-r13                         Q-RxLevMin,
            q-QualMin-r13                          Q-QualMin-r9
        },
        p-Max-r13                              P-Max                               OPTIONAL,    -- Need OP
        freqBandIndicator-r13                  FreqBandIndicator-NB-r13,
        freqBandInfo-r13                       NS-PmaxList-NB-r13                  OPTIONAL,    -- Need OR
        multiBandInfoList-r13                  MultiBandInfoList-NB-r13            OPTIONAL,    -- Need OR
        downlinkBitmap-r13                     DL-Bitmap-NB-r13                    OPTIONAL,    -- Need OP,
        eutraControlRegionSize-r13             ENUMERATED {n1, n2, n3}             OPTIONAL,    -- Cond inband
        nrs-CRS-PowerOffset-r13                ENUMERATED {dB-6,      dB-4dot77,       dB-3,
                                                           dB-1dot77, dB0,             dB1,
                                                           dB1dot23,  dB2,             dB3,
                                                           dB4,       dB4dot23,        dB5,
                                                           dB6,       dB7,             dB8,
                                                           dB9}                        OPTIONAL, -- Cond inband-SamePCI
        schedulingInfoList-r13                 SchedulingInfoList-NB-r13,
        si-WindowLength-r13                    ENUMERATED {ms160, ms320, ms480, ms640,
                                                           ms960, ms1280, ms1600, spare1},
        si-RadioFrameOffset-r13                INTEGER (1..15)           OPTIONAL,   -- Need OP
        systemInfoValueTagList-r13             SystemInfoValueTagList-NB-r13       OPTIONAL,    -- Need OR
        lateNonCriticalExtension               OCTET STRING                        OPTIONAL,
        nonCriticalExtension                   SystemInformationBlockType1-NB-v1350             OPTIONAL
}
SystemInformationBlockType1-NB-v1350 ::=   SEQUENCE {
        cellSelectionInfo-v1350                CellSelectionInfo-NB-v1350          OPTIONAL,    -- Cond Qrxlevmin
        nonCriticalExtension                   SystemInformationBlockType1-NB-v1430             OPTIONAL
}
SystemInformationBlockType1-NB-v1430 ::=   SEQUENCE {
        cellSelectionInfo-1430                 CellSelectionInfo-NB-v1430          OPTIONAL,    -- Need OR
        nonCriticalExtension                   SystemInformationBlockType1-NB-v15xy             OPTIONAL
}
SystemInformationBlockType1-NB-v15xy ::=   SEQUENCE {
        schedulingInfoList-r15                 SchedulingInfoList-NB-r15           OPTIONAL,    -- Need OR
        nonCriticalExtension                   SEQUENCE { }                        OPTIONAL
}
PLMN-IdentityList-NB-r13 ::=               SEQUENCE (SIZE (1..maxPLMN-r11)) OF PLMN-IdentityInfo-NB-r13
PLMN-IdentityInfo-NB-r13 ::=               SEQUENCE {
        plmn-Identity-r13                      PLMN-Identity,
        cellReservedForOperatorUse-r13         ENUMERATED {reserved, notReserved},
        attachWithoutPDN-Connectivity-r13      ENUMERATED {true}         OPTIONAL   -- Need OP
}
SchedulingInfoList-NB-r13 ::= SEQUENCE (SIZE (1..maxSI-Message-NB-r13)) OF SchedulingInfo-NB-r13
SchedulingInfo-NB-r13::=                   SEQUENCE {
        si-Periodicity-r13                     ENUMERATED {rf64, rf128, rf256, rf512,
                                                           rf1024, rf2048, rf4096, spare},
        si-RepetitonPattern-r13                ENUMERATED {every2ndRF, every4thRF, every8thRF,
                                                           every16thRF},
```

```
            sib-MappingInfo-r13           SIB-MappingInfo-NB-r13,
            si-TB-r13                     ENUMERATED {b56, b120, b208, b256, b328, b440, b552, b680}
}
SystemInfoValueTagList-NB-r13 ::=         SEQUENCE (SIZE (1.. maxSI-Message-NB-r13)) OF
                                              SystemInfoValueTagSI-r13
SIB-MappingInfo-NB-r13 ::=                SEQUENCE (SIZE (0..maxSIB-1)) OF SIB-TypeNB-r13
SIB-Type-NB-r13 ::=                       ENUMERATED {
                                              sibType3-NB-r13, sibType4-NB-r13, sibType5-NB-r13,
                                              sibType14-NB-r13, sibType16-NB-r13, sibType15-NB-r14,
                                              sibType20-NB-r14, sibType22-NB-r14}
CellSelectionInfo-NB-v1350 ::=            SEQUENCE {
            delta-RxLevMin-v1350              INTEGER (-8..-1)
}
CellSelectionInfo-NB-v1430 ::=            SEQUENCE {
            powerClass14dBm-Offset-r14        ENUMERATED {dB-6, dB-3, dB3, dB6, dB9, dB12}
            OPTIONAL,    -- Need OP
            ce-authorisationOffset-r14        ENUMERATED {dB5, dB10, dB15, dB20, dB25, dB30, dB35}
OPTIONAL   -- Need OP
}
SchedulingInfoList-NB-r15 ::= SEQUENCE (SIZE (1..maxSI-Message-NB-r13)) OF SchedulingInfo-NB-
r15
SchedulingInfo-NB-r15::=                  SEQUENCE {
            si-NB-mode-tdd                    ENUMERATED{anchor, non-anchor},
            inband-bandwidth-tdd              ENUMERATED{n25, n50, n75, n100},
            si-NB-position-tdd                ENUMERATED{lower_freq, higher_freq},
            si-NB-prbInfo-tdd                 ENUMERATED{first-prb, second-prb},
}
-- ASN1STOP
```

Figure 15:
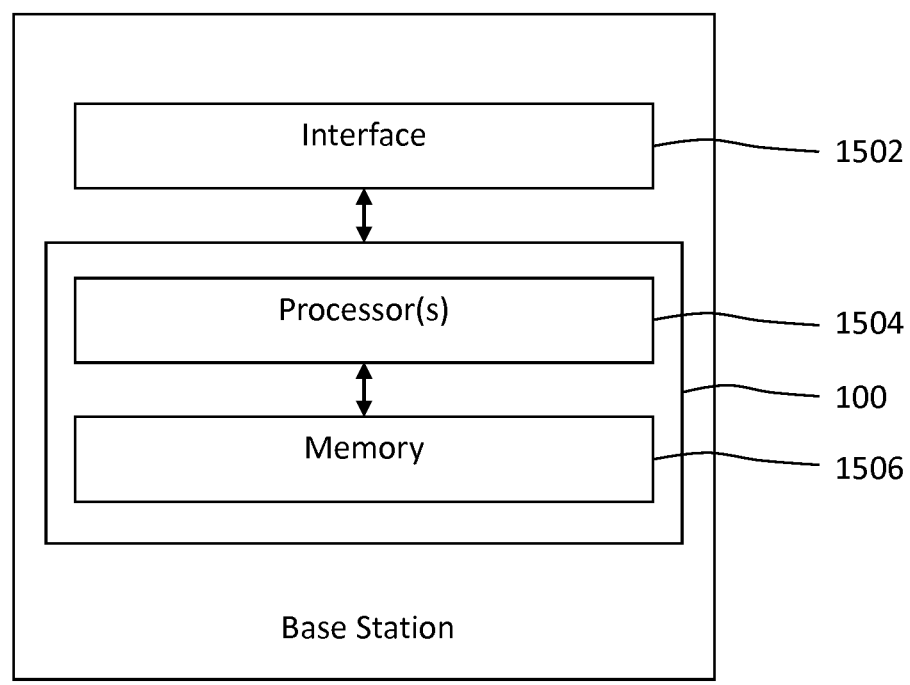
FIG. 15 shows a schematic block diagram of a first implementation of the device of FIG. 1.

FIG. 15 shows a schematic block diagram for an embodiment of the device 100. The device 100 comprises one or more processors 1504 for performing the method 200 and memory 1506 coupled to the processors 1504. For example, the memory 1506 may be encoded with instructions that implement at least one of the modules 102 and 104.

The one or more processors 1504 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1506, base station or RAN functionality. For example, the one or more processors 1504 may execute instructions stored in the memory 1506. Such functionality may include providing various features and steps discussed herein, including any of the benefits disclosed herein. The expression "the device being operative to perform an action" may denote the device 100 being configured to perform the action.

As schematically illustrated in FIG. 15, the device 100 may be embodied by a base station 510, e.g., of the RAN. The base station 510 comprises a radio interface 1502 coupled to the device 100 for radio communication with one or more radio devices.

Figure 16:
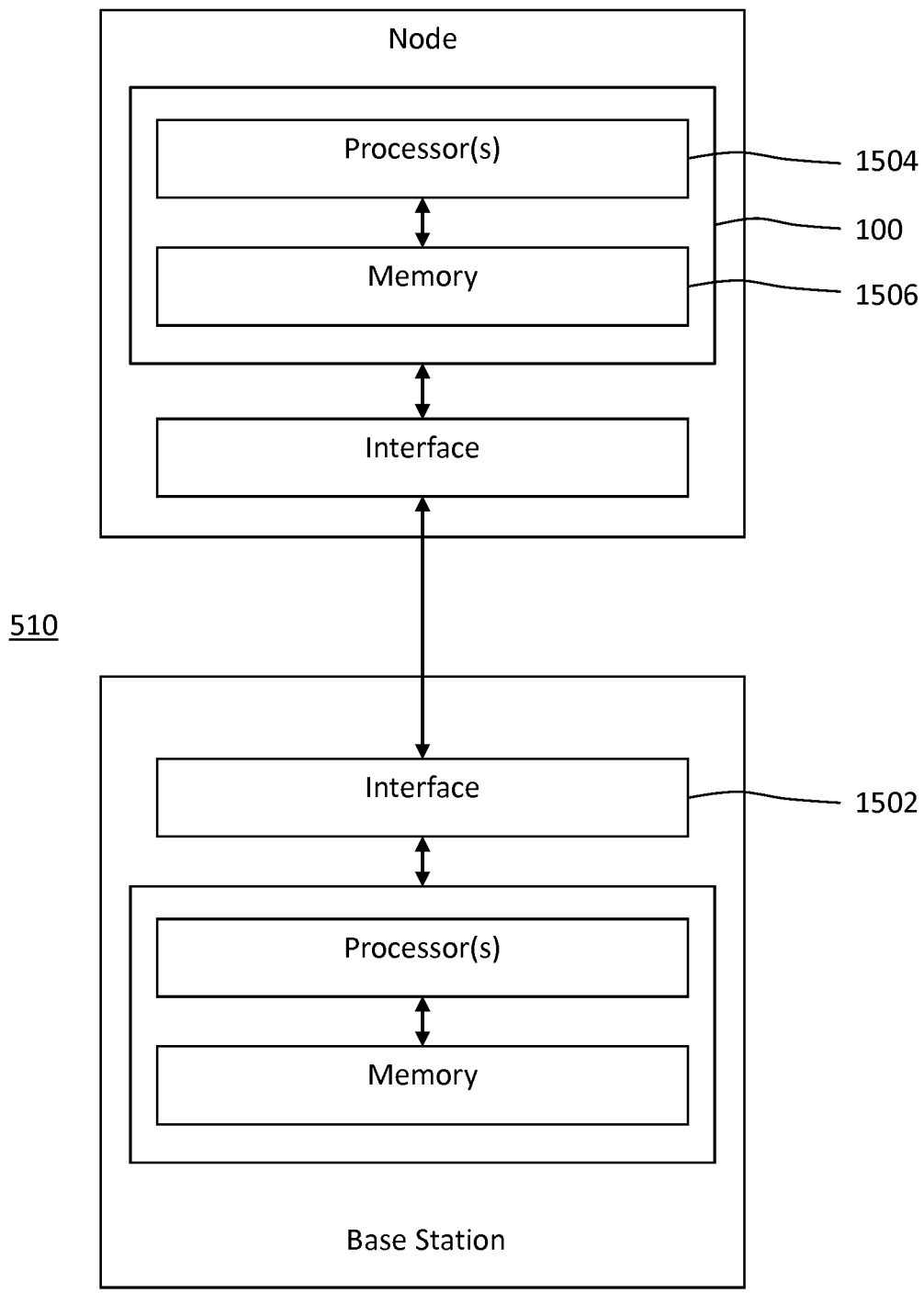
FIG. 16 shows a schematic block diagram of a second implementation of the device of FIG. 1.

In a variant, e.g., as schematically illustrated in FIG. 16, the functionality of the device 100 is provided by a node of the RAN or a core network linked to the RAN. That is, the node performs the method 200. The functionality of the device 100 is provided by the node to the base station 510, e.g., via the interface 1502 or a dedicated wired or wireless interface.

Figure 17:
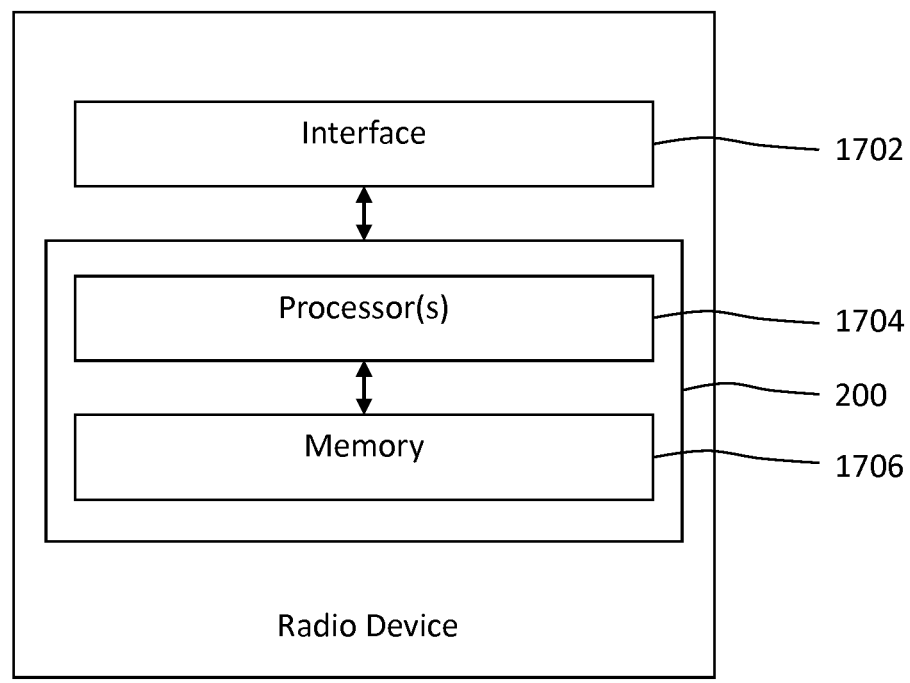
FIG. 17 shows a schematic block diagram of a first implementation of the device of FIG. 2.

FIG. 17 shows a schematic block diagram for an embodiment of the device 200. The device 200 comprises one or more processors 1704 for performing the method 200 and memory 1706 coupled to the processors 1704. For example, the memory 1706 may be encoded with instructions that implement at least one of the modules 102 and 104.

The one or more processors 1704 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1706, base station or RAN functionality. For example, the one or more processors 1704 may execute instructions stored in the memory 1706. Such functionality may include providing various features and steps discussed herein, including any of the benefits disclosed herein. The expression "the device being operative to perform an action" may denote the device 100 being configured to perform the action.

As schematically illustrated in FIG. 17, the device 200 may be embodied by a radio device 512. The radio device 512 comprises a radio interface 1702 coupled to the device 200 for radio communication with a base station of the RAN and/or one or more radio devices.

Figure 18:
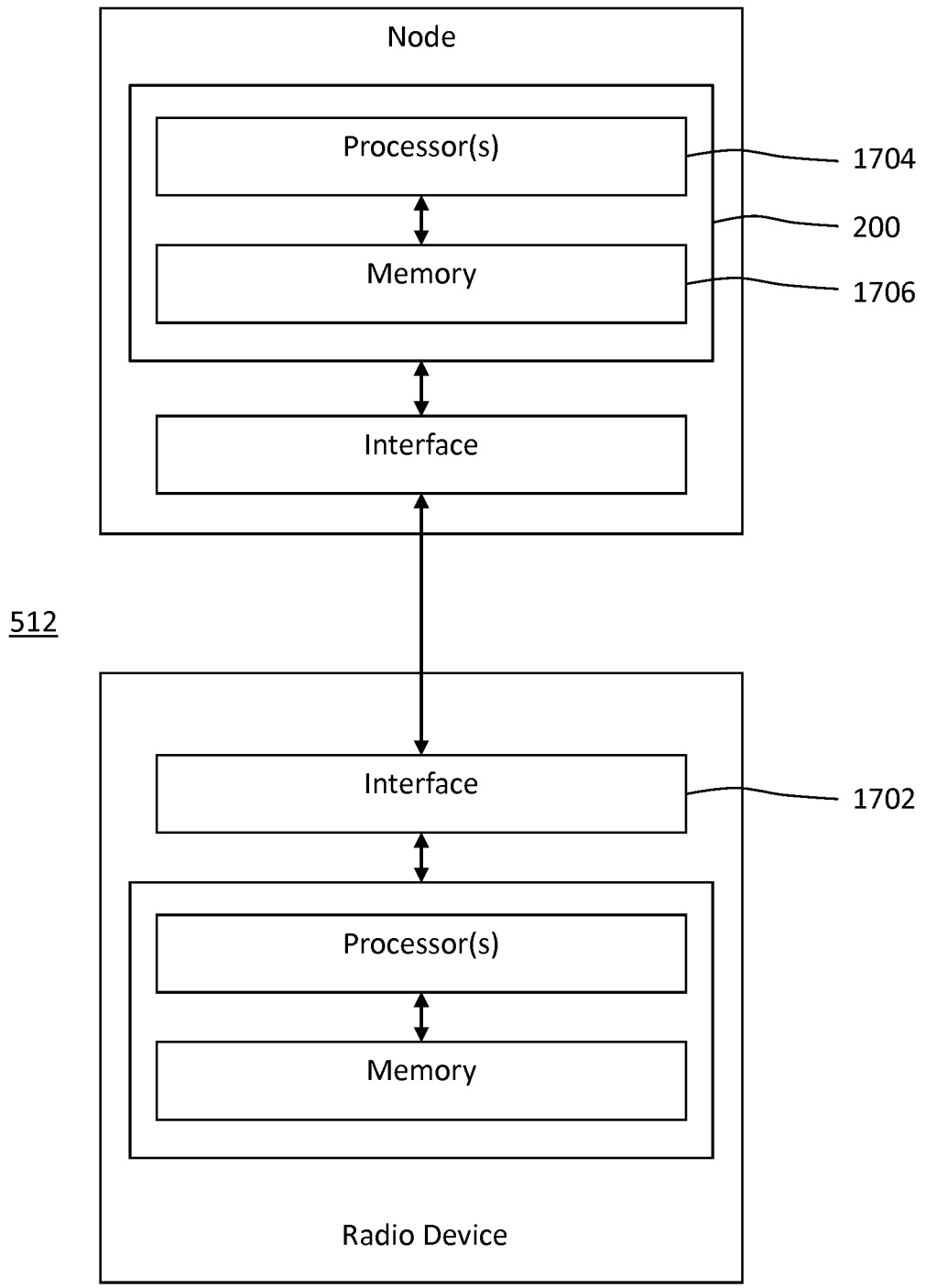
FIG. 18 shows a schematic block diagram of a second implementation of the device of FIG. 2.

In a variant, e.g., as schematically illustrated in FIG. 18, the functionality of the device 200 is provided by a terminal linked to the radio device 512. That is, the terminal performs the method 200. The functionality of the device 200 is provided by the terminal to the radio device 512, e.g., via the interface 1702 or a dedicated wired or wireless interface.

As has become apparent from above description, embodiments of the technique enable a radio device (e.g., a UE) to identify a SIB1-NB non-anchor carrier in a NB-IoT TDD system with just a few bits broadcasted in MIB-NB, which ensures NB-IoT TDD system to operate effectively and coexist with LTE-TDD.

Candidate positions for the NB-IoT TDD guard-band deployment may be located as close as possible to the LTE carrier, in order to reduce adjacent channel interference and to simplify implementation for network equipment.

The technique may also be employed in some other wireless access systems, in which similar challenges arise.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of transmitting system information for a narrowband (NB) time-division duplex (TDD) communication in a radio access network (RAN), the method comprising:
   transmitting a master information block (MIB) on an anchor carrier of the TDD communication in the RAN, the MIB indicating a frequency location of a non-anchor carrier, different from the anchor carrier, allocated to a system information block (SIB) of the TDD communication in the RAN; and
   transmitting the SIB on the non-anchor carrier indicated in the MIB;
   wherein no primary or secondary synchronization signal is transmitted on the non-anchor carrier;
   wherein the MIB is further indicative of an in-band or standalone NB deployment, and further
   indicative of whether the non-anchor carrier transmitting the SIB is arranged in a physical resource block (PRB) adjacent to a lower-frequency edge or a higher-frequency edge of a PRB used by the anchor carrier.

2. The method of claim 1, further comprising transmitting initial synchronization signals on the anchor carrier for the TDD communication in the RAN.

3. The method of claim 1, wherein transmissions on the anchor carrier are governed by an uplink-downlink configuration of the TDD communication in the RAN.

4. The method of claim 3, further comprising selectively transmitting and receiving payload data on the anchor carrier according to the uplink-downlink configuration of the TDD communication in the RAN.

5. The method of claim 1, wherein the TDD communication in the RAN is a narrowband (NB) radio communication involving NB devices.

6. The method of claim 5:
   wherein the RAN further provides radio access to mobile broadband (MBB) devices for a MBB communication in a MBB system bandwidth of the RAN; and
   wherein a NB used by the NB communication is deployed within the MBB system bandwidth or in a guard-band of the MBB system bandwidth.

7. The method of claim 6, wherein the NB system bandwidth encompasses at least one of the anchor carrier and the non-anchor carrier.

8. The method of claim 6:
   wherein physical resource blocks (PRBs) for the MBB communication are arranged in the frequency domain according to a PRB scheme; and
   wherein the anchor carrier for the NB communication is arranged in the frequency domain according to a carrier raster.

9. The method of claim 8:
   wherein the anchor carrier uses a PRB according to the PRB scheme; and
   wherein an offset between a center frequency of the PRB and a carrier of the carrier raster is equal to or less than 7.5 kHz or half of a subcarrier spacing.

10. The method of claim 9, wherein the non-anchor carrier uses another PRB according to the PRB scheme next to the PRB of the anchor carrier.

11. The method of claim 10, wherein at least one of the anchor carrier and the non-anchor carrier of the NB communication is located in one or more guard-bands of the MBB system bandwidth.

12. The method of claim 6, wherein the MIB is indicative of whether the anchor carrier and the non-anchor carrier are located in the same guard-band of the MBB system bandwidth or opposing guard-bands of the MBB system bandwidth.

13. The method of claim 6, wherein the anchor carrier is closer to a frequency edge of the MBB system bandwidth than the non-anchor carrier or equal to the frequency edge of the MBB system bandwidth.

14. The method of claim 6, wherein:
   the anchor carrier is closer to a MBB carrier frequency than the non-anchor carrier; or
   the anchor carrier and the non-anchor carrier are symmetrically arranged relative to the MBB carrier frequency.

15. The method of claim 6, wherein the MIB is indicative of whether the non-anchor carrier used for transmitting the SIB is located at a guard-band at the lower-frequency edge of the MBB system bandwidth or at a guard-band at the higher-frequency edge of the MBB system bandwidth.

16. The method of claim 6, wherein at least one of the anchor carrier and the non-anchor carrier of the NB communication is located within the MBB system bandwidth.

17. The method of claim 6, wherein at least one of the anchor carrier and the non-anchor carrier used for transmitting the SIB of the NB communication is located within the MBB system bandwidth.

18. The method of claim 1, wherein the MIB is indicative of a subframe used on the non-anchor carrier for transmitting the SIB.

19. A method of receiving system information for a narrowband (NB) time-division duplex (TDD) communication in a radio access network (RAN), the method comprising:
   receiving a master information block (MIB) on an anchor carrier of the TDD communication in the RAN, the MIB indicating a frequency location of a non-anchor carrier, different from the anchor carrier, allocated to a system information block (SIB) of the TDD communication in the RAN; and
   receiving the SIB on the non-anchor carrier indicated in the MIB;
   wherein no primary or secondary synchronization signal is received on the non-anchor carrier;
   wherein the MIB is further indicative of an in-band or standalone NB deployment, and further
   indicative of whether the non-anchor carrier transmitting the SIB is arranged in a physical resource block (PRB) adjacent to a lower-frequency edge or a higher-frequency edge of a PRB used by the anchor carrier.

20. A device for transmitting system information for a narrowband (NB) time-division duplex (TDD) communication in a radio access network (RAN), the device comprising:
   processing circuitry;
   memory containing instructions configured to be executed by the processing circuitry whereby the device is operative to:

transmit a master information block (MIB) on an anchor carrier of the TDD communication in the RAN, the MIB indicating a frequency location of a non-anchor carrier, different from the anchor carrier, allocated to a system information block (SIB) of the TDD communication in the RAN; and transmit the SIB on the non-anchor carrier indicated in the MIB;

wherein no primary or secondary synchronization signal is transmitted on the non-anchor carrier;

wherein the MIB is further indicative of an in-band or standalone NB deployment, and further indicative of whether the non-anchor carrier transmitting the SIB is arranged in a physical resource block (PRB) adjacent to a lower-frequency edge or a higher-frequency edge of a PRB used by the anchor carrier.

21. A device for receiving system information for a narrowband (NB) time-division duplex (TDD) communication in a radio access network (RAN), the device comprising:

processing circuitry;

memory containing instructions configured to be executed by the processing circuitry whereby the device is operative to:

receive a master information block (MIB) on an anchor carrier of the TDD communication in the RAN, the MIB indicating a frequency location of a non-anchor carrier, different from the anchor carrier, allocated to a system information block (SIB) of the TDD communication in the RAN; and receive the SIB on the non-anchor carrier indicated in the MIB;

wherein no primary or secondary synchronization signal is received on the non-anchor carrier;

wherein the MIB is further indicative of an in-band or standalone NB deployment, and further indicative of whether the non-anchor carrier transmitting the SIB is arranged in a physical resource block (PRB) adjacent to a lower-frequency edge or a higher-frequency edge of a PRB used by the anchor carrier.

* * * * *

UNITED STATES PATENT AND TRADEMARK OFFICE
CERTIFICATE OF CORRECTION

PATENT NO. : 12,028,794 B2
APPLICATION NO. : 16/759767
DATED : July 2, 2024
INVENTOR(S) : Höglund et al.

It is certified that error appears in the above-identified patent and that said Letters Patent is hereby corrected as shown below:

On the Title Page

In Item (57), under "ABSTRACT", in Column 2, Line 5, delete "(602 1)" and insert -- (602-1) --, therefor.

On Page 2, in Item (56), under "OTHER PUBLICATIONS", in Column 2, Line 38, delete "(E-Utra);" and insert -- (E-UTRA); --, therefor.

In the Drawings

In Fig. 3, Sheet 2 of 17, and on the Title Page, the illustrative print figure, for Tag "306", in Line 2, delete "SIB." and insert -- SIB --, therefor.

In Fig. 4, Sheet 3 of 17, for Tag "406", in Line 2, delete "SIB." and insert -- SIB --, therefor.

In the Specification

In Column 1, Line 20, delete "(3GPP)" and insert -- (3GPP), --, therefor.

In Column 2, Line 30, delete "off a" and insert -- a --, therefor.

In Column 2, Line 44, delete "NB IoT" and insert -- NB-IoT --, therefor.

In Column 2, Line 64, delete "NB IoT" and insert -- NB-IoT --, therefor.

In Column 3, Line 15, delete "context" and insert -- context of --, therefor.

In Column 4, Line 42, delete "illustrates" and insert -- illustrate --, therefor.

Signed and Sealed this
First Day of April, 2025

Coke Morgan Stewart
*Acting Director of the United States Patent and Trademark Office*

In Column 4, Line 46, delete "illustrates" and insert -- illustrate --, therefor.

In Column 4, Line 50, delete "illustrates" and insert -- illustrate --, therefor.

In Column 8, Line 28, delete "according" and insert -- according to --, therefor.

In Column 9, Line 60, delete "according" and insert -- according to --, therefor.

In Column 10, Line 65, delete "NB IoT" and insert -- NB-IoT --, therefor.

In Column 12, Line 38, delete "seconds." and insert -- 10 seconds. --, therefor.

In Column 15, Line 10, delete "guard-band 15" and insert -- guard-band --, therefor.

In Column 15, Line 11, delete "RI-160082" and insert -- R1-160082 --, therefor.

In Column 15, Line 17, delete "20 frequency" and insert -- frequency --, therefor.

In Column 16, Line 29, delete "(feNB-oT)" and insert -- (feNB-IoT) --, therefor.

In Columns 15 & 16, in Table, Line 4, delete "charrier" and insert -- carrier --, therefor.

In Column 17, Line 13, delete "label" and insert -- labeled --, therefor.

In Column 17, Line 17, delete "use" and insert -- used --, therefor.

In Column 18, Line 19, delete "according" and insert -- according to --, therefor.

In Column 19, Line 23, delete "illustrates" and insert -- illustrate --, therefor.

In Column 19, Line 57, delete "position 15" and insert -- position --, therefor.

In Column 20, Line 29, delete "is the" and insert -- as the --, therefor.

In Column 20, Line 31, delete "FIG. 12A to 12C" and insert -- FIGS. 12A to 12C --, therefor.

In Column 20, Line 50, delete "FIG. 10C," and insert -- FIG. 12C, --, therefor.

In Column 21, Line 6, delete "of the of the" and insert -- of the --, therefor.

In Columns 21 & 22, in Table, Line 7, delete "ENUMERATED{anchor, non-anchor}," and insert -- ENUMERATED {anchor, non-anchor}, --, therefor.

In Column 22, Line 37, delete "illustrates" and insert -- illustrate --, therefor.

In Column 23, Line 25, delete "examples the" and insert -- examples of the --, therefor.

CERTIFICATE OF CORRECTION (continued)
U.S. Pat. No. 12,028,794 B2

In Column 23, Line 46, delete "referred as" and insert -- referred to as --, therefor.

In Column 23, Line 56, delete "locate" and insert -- located --, therefor.

In Columns 23 & 24, in Table, Line 3, delete "ENUMERATED{n25, n50, n75, n100}," and insert -- ENUMERATED {n25, n50, n75, n100}, --, therefor.

In Columns 23 & 24, in Table, Line 4, delete "ENUMERATED{lower-freq, higher-freq}," and insert -- ENUMERATED {lower-freq, higher-freq}, --, therefor.

In Columns 23 & 24, in Table, Line 5, delete "ENUMERATED{first-prb, second-prb}," and insert -- ENUMERATED {first-prb, second-prb}, --, therefor.

In Column 24, Line 25, delete "(referred" and insert -- (referred to --, therefor.

In Column 24, Line 60, delete "according" and insert -- according to --, therefor.

In Columns 25 & 26, in Table, Line 5, delete "(0..31) ," and insert -- (0..31), --, therefor.

In Columns 25 & 26, in Table, Line 7, delete "ENUMERATED{anchor, non-anchor}," and insert -- ENUMERATED {anchor, non-anchor}, --, therefor.

In Columns 25 & 26, in Table, Line 8, delete "ENUMERATED{lower_freq, higher_freq}," and insert -- ENUMERATED {lower_freq, higher_freq}, --, therefor.

In Columns 27 & 28, in Table, Line 3, delete "INTEGER(1..16)" and insert -- INTEGER (1..16) --, therefor.

In Columns 27 & 28, in Table, Line 2, delete "MasterlnformationBlock-NB" and insert -- MasterInformationBlock-NB --, therefor.

In Columns 29 & 30, in Table-continued, Line 1, delete "ENUMERATED{n25, n50, n75, n100}," and insert -- ENUMERATED {n25, n50, n75, n100}, --, therefor.

In Columns 29 & 30, in Table-continued, Line 2, delete "ENUMERATED{lower_freq, higher_freq}," and insert -- ENUMERATED {lower_freq, higher_freq}, --, therefor.

In Columns 29 & 30, in Table-continued, Line 3, delete "ENUMERATED{first-prb, second-prb}," and insert -- ENUMERATED {first-prb, second-prb}, --, therefor.

In Columns 29 & 30, in Table-continued, Line 12, delete "ENUMERATED{lower_freq, higher_freq}," and insert -- ENUMERATED {lower_freq, higher_freq}, --, therefor.

In Columns 29 & 30, in Table, Line 7, delete "ENUMERATED{anchor," and insert -- ENUMERATED {anchor, --, therefor.

CERTIFICATE OF CORRECTION (continued)
U.S. Pat. No. 12,028,794 B2

In Columns 31 & 32, in Table, Line 7, delete "ENUMERATED{anchor subframe0," and insert
-- ENUMERATED {anchor_subframe0, --, therefor.

In Column 32, Line 5, delete "filed." and insert -- field. --, therefor.

In Column 32, Line 40, delete "sib-NB-mode-tdd" and insert -- sib1-NB-mode-tdd --, therefor.

In Columns 31 & 32, in Table, Line 8, delete "ENUMERATED{anchor," and insert
-- ENUMERATED {anchor, --, therefor.

In Columns 33 & 34, in Table-continued, Line 6, delete "ENUMERATED{first-prb, second-prb }," and insert -- ENUMERATED {first-prb, second-prb}, --, therefor.

In Columns 33 & 34, in Table-continued, Line 8, delete "Inband-SamePCI-NB-r13" and insert
-- Inband-SamePCI-NB-r13 ::= --, therefor.

In Column 33, Line 29, delete "sib-NB-mode-tdd." and insert -- sib1-NB-mode-tdd. --, therefor.

In Columns 37 & 38, in Table-continued, Line 23, delete "ENUMERATED{anchor, non-anchor},"
and insert -- ENUMERATED {anchor, non-anchor}, --, therefor.

In Columns 37 & 38, in Table-continued, Line 25, delete "ENUMERATED{lower_freq, higher_freq}," and insert -- ENUMERATED {lower_freq, higher_freq}, --, therefor.

In Columns 37 & 38, in Table-continued, Line 26, delete "ENUMERATED{first-prb, second-prb},"
and insert -- ENUMERATED {first-prb, second-prb}, --, therefor.